US009529626B2

(12) United States Patent
Wang et al.

(10) Patent No.: US 9,529,626 B2
(45) Date of Patent: Dec. 27, 2016

(54) FACILITATING EQUITABLE DISTRIBUTION OF THREAD RESOURCES FOR JOB TYPES ASSOCIATED WITH TENANTS IN A MULTI-TENANT ON-DEMAND SERVICES ENVIRONMENT

(71) Applicant: salesforce.com,inc., San Francisco, CA (US)

(72) Inventors: Xiaodan Wang, Dublin, CA (US); Vijayanth Devadhar, Fremont, CA (US); Praveen Murugesan, Foster City, CA (US)

(73) Assignee: salesforce.com, inc., San Francisco, CA (US)

( * ) Notice: Subject to any disclaimer, the term of this patent is extended or adjusted under 35 U.S.C. 154(b) by 317 days.

(21) Appl. No.: 13/841,417

(22) Filed: Mar. 15, 2013

(65) Prior Publication Data
US 2014/0075030 A1 Mar. 13, 2014

Related U.S. Application Data

(60) Provisional application No. 61/708,283, filed on Oct. 1, 2012, provisional application No. 61/711,837, filed
(Continued)

(51) Int. Cl.
*H04L 9/32* (2006.01)
*G06F 15/173* (2006.01)
(Continued)

(52) U.S. Cl.
CPC .............. *G06F 9/50* (2013.01); *G06F 9/5027* (2013.01); *G06Q 30/08* (2013.01); *H04L 43/08* (2013.01);
(Continued)

(58) Field of Classification Search
CPC ................ H04L 47/70; H04L 12/2869; H04L 2012/5631; H04L 47/823
(Continued)

(56) References Cited

U.S. PATENT DOCUMENTS 5,577,188 A 11/1996 Zhu
5,608,872 A 3/1997 Schwartz et al.
(Continued)

FOREIGN PATENT DOCUMENTS

EP 1510917 3/2005
GB 2475897 6/2011

OTHER PUBLICATIONS

PCT/US2013/045509, Notification of Transmittal of the International Searching Report and the Written Opinion of the International Searching Authority, Mailed Oct. 9, 2013.
(Continued)

*Primary Examiner* — Kevin Bates
*Assistant Examiner* — Golam Mahmud
(74) *Attorney, Agent, or Firm* — Blakely, Sokoloff, Taylor & Zafman LLP

(57) ABSTRACT

In accordance with embodiments, there are provided mechanisms and methods for facilitating a fair allocation and usage of thread resources for user messages according to one embodiment in an on-demand services environment. In one embodiment and by way of example, a method includes tracking resource usage associated with a plurality of messages performed and completed in response to requests placed by a user via a user interface at a computing device, where the tracking includes recording an amount of resources consumed by each completed message. The method may further include classifying the plurality of messages into job types based on the tracked resource usage associated with the plurality of messages, and enforcing,
(Continued)

based on the classification of the messages, a message selection process to ensure equitable distribution of resources to subsequently received messages.

21 Claims, 12 Drawing Sheets

Related U.S. Application Data on Oct. 10, 2012, provisional application No. 61/709,263, filed on Oct. 3, 2012, provisional application No. 61/700,032, filed on Sep. 12, 2012, provisional application No. 61/700,037, filed on Sep. 12, 2012.

(51) Int. Cl.

| | | |
|---|---|---|
| *G06F 17/30* | (2006.01) | |
| *G06F 21/00* | (2013.01) | |
| *G06F 9/50* | (2006.01) | |
| *G06Q 30/08* | (2012.01) | |
| *H04L 12/26* | (2006.01) | |
| *H04L 12/911* | (2013.01) | |

(52) U.S. Cl.
CPC ......... *H04L 47/70* (2013.01); *G06F 2209/508* (2013.01)

(58) Field of Classification Search
USPC ....................................................... 709/226
See application file for complete search history.

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,937,205 A | 8/1999 | Mattson |
| 5,963,953 A | 10/1999 | Cram et al. |
| 6,092,083 A | 7/2000 | Brodersen et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,135 B1 | 4/2001 | Brodersen et al. |
| 6,233,617 B1 | 5/2001 | Rothwein et al. |
| 6,266,669 B1 | 7/2001 | Brodersen et al. |
| 6,295,530 B1 | 9/2001 | Ritchie et al. |
| 6,324,568 B1 | 11/2001 | Diec |
| 6,324,693 B1 | 11/2001 | Brodersen et al. |
| 6,336,137 B1 | 1/2002 | Lee et al. |
| D454,139 S | 3/2002 | Feldcamp |
| 6,367,077 B1 | 4/2002 | Brodersen et al. |
| 6,393,605 B1 | 5/2002 | Loomans |
| 6,405,220 B1 | 6/2002 | Brodersen et al. |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker et al. |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 7,289,976 B2 | 10/2007 | Kihneman |
| 7,340,411 B2 | 3/2008 | Cook |
| 7,620,655 B2 | 11/2009 | Larsson et al. |
| 7,640,339 B1 | 12/2009 | Caronni et al. |
| 7,730,478 B2 | 6/2010 | Weissman |
| 8,321,558 B1 * | 11/2012 | Sirota ................... G06F 9/5011 709/201 |
| 8,504,691 B1 * | 8/2013 | Tobler .................... H04L 67/02 370/229 |
| 8,949,839 B2 | 2/2015 | Balasubramaniam |
| 2001/0044791 A1 | 11/2001 | Richter et al. |
| 2002/0022986 A1 | 2/2002 | Coker et al. |
| 2002/0029161 A1 | 3/2002 | Brodersen et al. |
| 2002/0029376 A1 | 3/2002 | Ambrose et al. |
| 2002/0035577 A1 | 3/2002 | Brodersen et al. |
| 2002/0042264 A1 | 4/2002 | Kim |
| 2002/0042843 A1 | 4/2002 | Diec |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0152102 A1 | 10/2002 | Brodersen et al. |
| 2002/0161734 A1 | 10/2002 | Stauber et al. |
| 2002/0162090 A1 | 10/2002 | Parnell et al. |
| 2002/0165742 A1 | 11/2002 | Robins |
| 2003/0004971 A1 | 1/2003 | Gong et al. |
| 2003/0018705 A1 | 1/2003 | Chen et al. |
| 2003/0018830 A1 | 1/2003 | Chen et al. |
| 2003/0033191 A1 | 2/2003 | Davies et al. |
| 2003/0066031 A1 | 4/2003 | Laane |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker |
| 2003/0088545 A1 | 5/2003 | Subramaniam et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec |
| 2003/0189600 A1 | 10/2003 | Gune et al. |
| 2003/0191743 A1 | 10/2003 | Brodersen et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan, Jr. et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |

(56) References Cited

U.S. PATENT DOCUMENTS

| | | |
|---|---|---|
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2005/0183084 A1 | 8/2005 | Cuomo |
| 2005/0223022 A1 | 10/2005 | Weissman |
| 2006/0122927 A1 | 6/2006 | Huberman et al. |
| 2007/0016663 A1 | 1/2007 | Weis |
| 2007/0055554 A1* | 3/2007 | Sussman .............. G06Q 10/02 705/5 |
| 2007/0091841 A1* | 4/2007 | Bhushan ........... H04W 72/1231 370/329 |
| 2007/0254628 A1* | 11/2007 | Rybak ................ H04L 12/14 455/405 |
| 2008/0178187 A1 | 7/2008 | Altshuler |
| 2009/0119080 A1 | 5/2009 | Gray et al. |
| 2009/0164635 A1 | 6/2009 | Denker |
| 2009/0177356 A1 | 7/2009 | Plawecki |
| 2009/0177744 A1 | 7/2009 | Marlow et al. |
| 2009/0201935 A1* | 8/2009 | Hass ................ G06F 9/30054 370/395.32 |
| 2009/0265205 A1 | 10/2009 | Stinchcombe |
| 2010/0049570 A1* | 2/2010 | Li ..................... G06Q 10/06 718/104 |
| 2010/0076805 A1 | 3/2010 | Batsakis |
| 2010/0103938 A1* | 4/2010 | Musoll ................ G06F 9/546 370/392 |
| 2010/0229218 A1* | 9/2010 | Kumbalimutt ........ G06F 9/5005 726/4 |
| 2010/0235887 A1 | 9/2010 | Burch |
| 2011/0131645 A1 | 6/2011 | Johnson et al. |
| 2011/0231457 A1* | 9/2011 | Tager ................ G06F 17/30306 707/825 |
| 2011/0296515 A1* | 12/2011 | Krstic ................ H04L 9/3213 726/10 |
| 2012/0011518 A1* | 1/2012 | Duan .................. G06F 9/505 718/104 |
| 2012/0192194 A1 | 7/2012 | Richardson |
| 2012/0311153 A1 | 12/2012 | Morgan |
| 2013/0024496 A1 | 1/2013 | Krishnan |
| 2013/0111031 A1 | 5/2013 | Hoffmann |
| 2013/0262931 A1 | 10/2013 | Siddalingesh |
| 2014/0068620 A1 | 3/2014 | Factor |
| 2014/0075017 A1 | 3/2014 | Wang |
| 2014/0075445 A1 | 3/2014 | Wang |
| 2014/0289418 A1* | 9/2014 | Cohen ................ G06F 11/3688 709/226 |

OTHER PUBLICATIONS

PCT International Preliminary Report on Patentability and Written Opinion of the International Searching Authority, International Application No. PCT/US2013/045509 Mailed Mar. 17, 2015, 5 pgs.
PCT/US2013/045511, Notification of Transmittal of the International Search Report and the Written Opinion of the International Searching Authority Mailed Oct. 9, 2013, 8 pgs.
Lee, Juong-Sik, Recurrent auctions in e-commerce, Rensslaer Polytechnic Institute, ProQuest Dissertations Publishing 2007, 3299458, 2 pages, downloaded from ProQuestDirect on the Internet on Sep. 21, 2015.
U.S. Appl. No. 13/841,417 Non-Final Office Action mailed Dec. 24, 2015, 13 pages.

* cited by examiner

FACILITATING EQUITABLE DISTRIBUTION OF THREAD RESOURCES FOR JOB TYPES ASSOCIATED WITH TENANTS IN A MULTI-TENANT ON-DEMAND SERVICES ENVIRONMENT

CLAIM OF PRIORITY

This application claims the benefit of U.S. Provisional Patent Application No. 61/708,283, entitled "System and Method for Allocation of Resources in an On-Demand System" by Xiaodan Wang, et al., filed Oct. 1, 2012, U.S. Provisional Patent Application No. 61/711,837, entitled "System and Method for Auction-Based Multi-Tenant Resource Sharing" by Xiaodan Wang, filed Oct. 10, 2012, U.S. Provisional Patent Application No. 61/709,263, entitled "System and Method for Quorum-Based Coordination of Broker Health" by Xiaodan Wang, et al., filed Oct. 3, 2012, U.S. Provisional Patent Application No. 61/700,032, entitled "Adaptive, Tiered, and Multi-Tenant Routing Framework for Workload Scheduling" by Xiaodan Wang, et al., filed Sep. 12, 2012, U.S. Provisional Patent Application No. 61/700,037, entitled "Sliding Window Resource Tracking in Message Queue" by Xiaodan Wang, et al., filed Sep. 12, 2012, the entire contents of which are incorporated herein by reference and priority is claimed thereof, the entire contents of which are incorporated herein by reference and priority is claimed thereof.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

One or more implementations relate generally to data management and, more specifically, to a mechanism for facilitating management and allocation of thread resources for message queues in an on-demand services environment.

BACKGROUND

Large-scale cloud platform vendors and service providers receive millions of asynchronous and resource-intensive customer requests each day that make for extremely cumbersome resource allocation and scalability requirements for the service providers. Most customers get frustrated waiting for their request to be fulfilled because none of the conventional techniques provide for any real-time guarantees in responding to such requests. Moreover, multi-tenancy means that multiple users compete for a limited pool of resources, making it even more complex to ensure proper scheduling of resources in a manner that is consistent with customer expectations.

Distributing point of delivery resources, such as application server thread time, equitably among different types of messages has been a challenge, particularly in a multi-tenant on-demand system. A message refers to a unit of work that is performed on an application server. Messages can be grouped into any number of types, such as roughly 300 types, ranging from user facing work such as refreshing a report on the dashboard to internal work, such as deleting unused files. As such, messages exhibit wide variability in the amount of resources they consume including thread time. This can lead to starvation by long running messages, which deprive short messages from receiving their fair share of thread time. When this impacts customer-facing work, such as a dashboard, customers are likely to dislike and complain when faced with performance degradation.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

In conventional database systems, users access their data resources in one logical database. A user of such a conventional system typically retrieves data from and stores data on the system using the user's own systems. A user system might remotely access one of a plurality of server systems that might in turn access the database system. Data retrieval from the system might include the issuance of a query from the user system to the database system. The database system might process the request for information received in the query and send to the user system information relevant to the request. The secure and efficient retrieval of accurate information and subsequent delivery of this information to the user system has been and continues to be a goal of administrators of database systems. Unfortunately, conventional database approaches are associated with various limitations.

SUMMARY

In accordance with embodiments, there are provided mechanisms and methods for facilitating a fair allocation and usage of thread resources for user messages according to one embodiment in an on-demand services environment. In one embodiment and by way of example, a method includes tracking resource usage associated with a plurality of messages performed and completed in response to requests placed by a user via a user interface at a computing device, where the tracking includes recording an amount of resources consumed by each completed message. The method may further include classifying the plurality of messages into job types based on the tracked resource usage associated with the plurality of messages, and enforcing, based on the classification of the messages, a message selection process to ensure equitable distribution of resources to subsequently received messages.

While the present invention is described with reference to an embodiment in which techniques for facilitating management of data in an on-demand services environment are implemented in a system having an application server providing a front end for an on-demand database service capable of supporting multiple tenants, the present invention is not limited to multi-tenant databases nor deployment on application servers. Embodiments may be practiced using other database architectures, i.e., ORACLE®, DB2® by IBM and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

BRIEF DESCRIPTION OF THE DRAWINGS

In the following drawings like reference numbers are used to refer to like elements. Although the following figures depict various examples, one or more implementations are not limited to the examples depicted in the figures.

FIG. 3A-3B illustrate a fair allocation and usage of thread resources using sliding window maintenance as provided by the thread resource management mechanism of FIG. 1 according to one embodiment;

DETAILED DESCRIPTION

Figure 1:
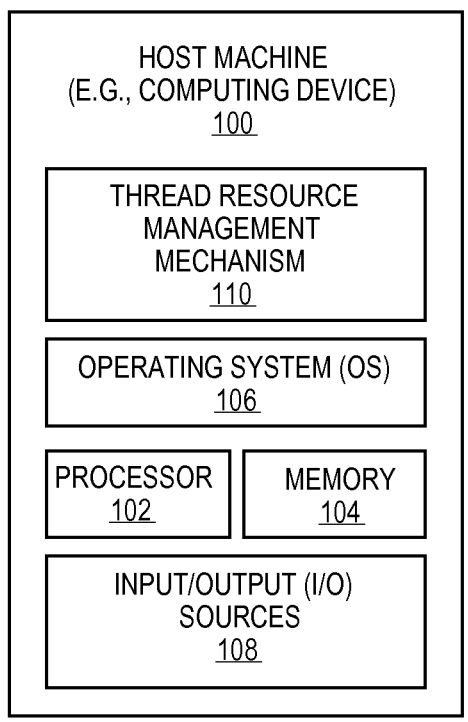
FIG. 1 illustrates a computing device employing a thread resource management mechanism according to one embodiment.

Methods and systems are provided for facilitating a fair allocation and usage of thread resources for user messages according to one embodiment in an on-demand services environment. In one embodiment and by way of example, a method includes tracking resource usage associated with a plurality of messages performed and completed in response to requests placed by a user via a user interface at a computing device, where the tracking includes recording an amount of resources consumed by each completed message. The method may further include classifying the plurality of messages into job types based on the tracked resource usage associated with the plurality of messages, and enforcing, based on the classification of the messages, a message selection process to ensure equitable distribution of resources to subsequently received messages.

Large-scale cloud platform vendors and service providers receive millions of asynchronous and resource-intensive customer requests each day that make for extremely cumbersome resource utilization and continued scalability for the service providers. Moreover, multi-tenancy means that multiple users compete for a limited pool of resources, making it even more complex to ensure proper scheduling of resources in a manner that is consistent of customer expectations. Embodiments provide for a novel mechanism having a novel scheduling framework for: 1) differentiating customer requests based on latency of tasks, such that low latency tasks are performed after long running background tasks; and 2) isolating tasks based on their resource requirement and/or customer affiliation so that a task requested by one customer may not occupy the entire system and starve off other tasks requested by other customers. Embodiments further provide for the mechanism to utilize resources efficiently to ensure high throughput even when contention is high, such as any available resources may not remain idle if tasks are waiting to be scheduled.

Embodiments disclosed herein relate to providing a novel mechanism including a scheduling framework in a message queue ("MQ") to facilitate fair allocation of thread resources among competing message types at a point of delivery ("POD").

As used herein, a term multi-tenant database system refers to those systems in which various elements of hardware and software of the database system may be shared by one or more customers. For example, a given application server may simultaneously process requests for a great number of customers, and a given database table may store rows for a potentially much greater number of customers. As used herein, the term query plan refers to a set of steps used to access information in a database system.

Embodiments are described with reference to an embodiment in which techniques for facilitating management of data in an on-demand services environment are implemented in a system having an application server providing a front end for an on-demand database service capable of supporting multiple tenants, embodiments are not limited to multi-tenant databases nor deployment on application servers. Embodiments may be practiced using other database architectures, i.e., ORACLE®, DB2® by IBM and the like without departing from the scope of the embodiments claimed.

Next, mechanisms and methods for facilitating mechanism for facilitating allocation of thread resources in an on-demand services environment will be described with reference to example embodiments.

FIG. 1 illustrates a computing device 100 employing a thread resource management mechanism 110 according to one embodiment. In one embodiment, computing device 100 serves as a host machine employing a thread resource management mechanism ("resource mechanism") 110 for message queues for facilitating dynamic management of application server thread resources facilitating fair and efficient management of thread resources and their corresponding messages, including their tracking, allocation, routing, etc., for providing better management of system resources as well as promoting user-control and customization of various services typically desired or necessitated by a user (e.g., a company, a corporation, an organization, a business, an agency, an institution, etc.). The user refers to a customer of a service provider (e.g., Salesforce.com) that provides and manages resource mechanism 110 at a host machine, such as computing device 100.

Computing device 100 may include server computers (e.g., cloud server computers, etc.), desktop computers, cluster-based computers, set-top boxes (e.g., Internet-based cable television set-top boxes, etc.), and the like. Computing device 100 may also include smaller computers, such as mobile computing devices, such as cellular phones including smartphones (e.g., iPhone® by Apple®, BlackBerry® by Research in Motion®, etc.), handheld computing devices, personal digital assistants (PDAs), etc., tablet computers (e.g., iPad® by Apple®, Galaxy® by Samsung®, etc.), laptop computers (e.g., notebooks, netbooks, Ultrabook™, etc.), e-readers (e.g., Kindle® by Amazon.com®, Nook® by Barnes and Nobles®, etc.), Global Positioning System (GPS)-based navigation systems, etc.

Computing device 100 includes an operating system (OS) 106 serving as an interface between any hardware or physical resources of the computing device 100 and a user. Computing device 100 further includes one or more processors 102, memory devices 104, network devices, drivers, or the like, as well as input/output (I/O) sources 108, such as touchscreens, touch panels, touch pads, virtual or regular keyboards, virtual or regular mice, etc. It is to be noted that terms like "node", "computing node", "client", "client device", "server", "server device", "cloud computer", "cloud server", "cloud server computer", "machine", "host machine", "device", "computing device", "computer", "computing system", "multi-tenant on-demand data system", and the like, may be used interchangeably throughout this document. It is to be further noted that terms like "application", "software application", "program", "software program", "package", and "software package" may be used interchangeably throughout this document. Moreover, terms like "job", "request" and "message" may be used interchangeably throughout this document.

Figure 2:
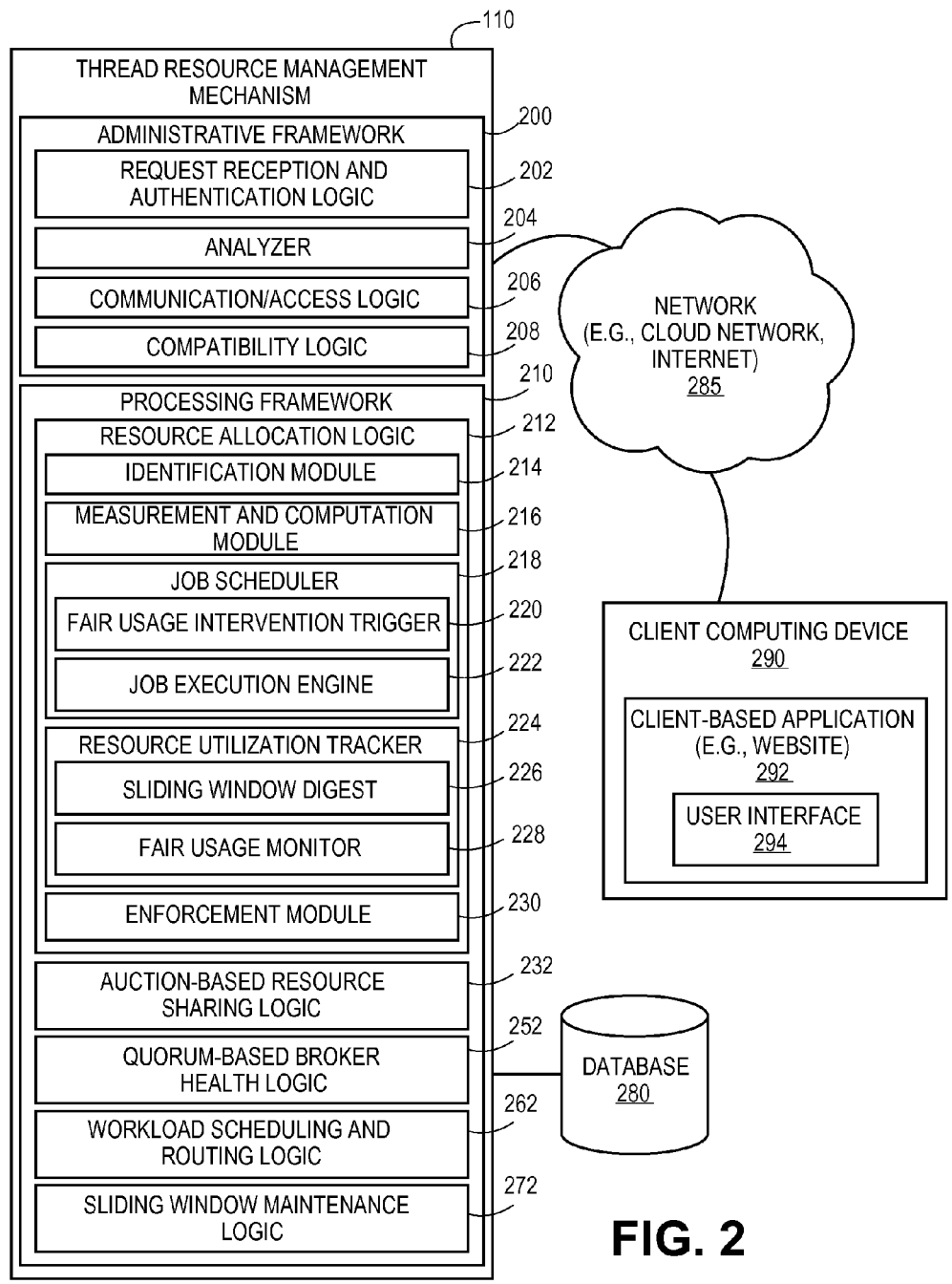
FIG. 2 illustrates a thread resource management mechanism according to one embodiment.

FIG. 2 illustrates a thread resource management mechanism 110 according to one embodiment. In one embodiment, resource mechanism 110 provides a novel scheduling framework for message queue management to facilitate fair allocation of thread resources among competing message types at a point of delivery.

In the illustrated embodiment, resource mechanism 110 may include various components, such as administrative framework 200 including request reception and authentication logic 202, analyzer 204, communication/access logic 206, and compatibility logic 208. Resource mechanism 110 includes additional components, such as processing framework 210 having resource allocation logic 212, auction-based resource sharing logic 232, quorum-based broker health logic 252, workload scheduling routing logic 262, and sliding window maintenance logic 272. In one embodiment, resource allocation logic 212 may include identification module 214, measurement and computation module 216, job scheduler 218 including fair usage intervention trigger 220 and job execution engine 222, resource utilization tracker 224 including sliding window digest 226 and fair usage monitor 228, and enforcement module 230.

It is contemplated that any number and type of components may be added to and/or removed from resource mechanism 110 to facilitate various embodiments including adding, removing, and/or enhancing certain features. For brevity, clarity, and ease of understanding of resource mechanism 110, many of the standard and/or known components, such as those of a computing device, are not shown or discussed here. It is contemplated that embodiments are not limited to any particular technology, topology, system, architecture, and/or standard and are dynamic enough to adopt and adapt to any future changes.

In some embodiments, resource mechanism 110 may be in communication with database 280 to store data, metadata, tables, reports, etc., relating to messaging queues, etc. Resource mechanism 110 may be further in communication with any number and type of client computing devices, such as client computing device 290 over network 285. Throughout this document, the term "logic" may be interchangeably referred to as "framework" or "component" or "module" and may include, by way of example, software, hardware, and/or any combination of software and hardware, such as firmware. This combination of components provided through resource mechanism 110 facilitates user-based control and manipulation of particular data products/software applications (e.g., social websites, business websites, word processing, spreadsheets, database products, etc.) to be manipulated, shared, communicated, and displayed in any number and type of formats as desired or necessitated by user and communicated through user interface 294 at client computing device 292 and over network 290.

It is contemplated that a user may include an administrative user or an end-user. An administrative user may include an authorized and/or trained user, such as a system administrator, a software developer, a computer programmer, etc. In contrast, an end-user may be any user that can access a client computing device, such as via a software application or an Internet browser. In one embodiment, a user, via user interface 294 at client computing device 290, may manipulate or request data as well as view the data and any related metadata in a particular format (e.g., table, spreadsheet, etc.) as desired or necessitated by the user. Examples of users may include, but are not limited to, customers (e.g., end-user) or employees (e.g., administrative user) relating to organizations, such as organizational customers (e.g., small and large businesses, companies, corporations, academic institutions, government agencies, non-profit organizations, etc.) of a service provider (e.g., Salesforece.com). It is to be noted that terms like "user", "customer", "organization", "business", "company", etc., may be used interchangeably throughout this document.

In one embodiment, resource mechanism 110 may be employed at a server computing system, such as computing device 100 of FIG. 1, and may be in communication with one or more client computing devices, such as client computing device 290, over a network, such as network 285 (e.g., a cloud-based network, the Internet, etc.). As aforementioned, a user may include an organization or organizational customer, such as a company, a business, etc., that is a customer to a provider (e.g., Salesforce.com) that provides access to resource mechanism 110 (such as via client computer 290). Similarly, a user may further include an individual or a small business, etc., that is a customer of the organization/organizational customer and accesses resource mechanism 110 via another client computing device. Client computing device 290 may be the same as or similar to computing device 100 of FIG. 1 and include a mobile computing device (e.g., smartphones, tablet computers, etc.) or larger computers (e.g., desktop computers, server computers, etc.).

In one embodiment, resource mechanism 110 facilitates fair and efficient management of message routing and queues for efficient management of system resources, such as application servers, etc., and providing better customer service, where the users may accessing these services via user interface 294 provided through any number and type of software applications (e.g., websites, etc.) employing social and business networking products, such as Chatter® by Salesforce.com, Facebook®, LinkedIn®, etc.

In one embodiment, request reception and authentication logic 202 may be used to receive a request (e.g., print a document, move a document, merge documents, run a report, display data, etc.) placed by a user via client computing device 290 over network 285. Further, request reception and authentication logic 202 may be used to authenticate the received request as well as to authenticate the user (and/or the corresponding customer) and/or computing device 290 before the user is allowed to place the request. It is contemplated that in some embodiments, the authentication process may be a one-time process conducted when computing device 290 is first allowed access to resource mechanism 110 or, in some embodiments, authentication may be a recurring process that is performed each time a request is received by request reception and authentication logic 202 at resource mechanism 110 at the cloud-based server computing device via network 285.

Once the authentication process is concluded, the request is sent to analyzer 204 to analysis and based on the results of the analysis, the request is forwarded on to processing framework 210 for proper processing by one or more components 212, 232, 252, 262, 272 and their sub-components 214-230. Communication/access logic 206 facilitates communication between the server computing device hosting resource mechanism 110 and other computing devices including computing device 290 and other client computing devices (capable of being accessed by any number of users/customers) as well as other server computing devices. Compatibility logic 208 facilitates dynamic compatibility between computing devices (e.g., computing device 290), networks (e.g., network 285), any number and type of software packages (e.g., websites, social networking sites, etc.).

In one embodiment, resource mechanism 110 and its resource allocation logic 212 allows for minimizing the chances of starvation between message types by closely tracking resource usage in production and automatically adapting the message selection process to ensure that thread time is distributed equitably. In one implementation, the technology disclosed herein may include real-time tracking of thread usage using a sliding window, computing fairness based on usage and queuing time, adaptive intervention that is tunable via configurable thresholds, novel techniques for selection of messages by usage, supporting message types with user-defined limits on number of concurrent threads, supporting message types that are throttled due to resource constraints, and supporting messages with extremely long running times or short queuing times.

For example, in one implementation, the technology disclosed herein can include thread resources in MQ that are distributed equitably among competing message types. "Fairness" is measured by total thread time to accommodate message types of various sizes and ensure fair selection (e.g., equal chance of being picked) as well as fair allocation of usage (e.g., equal usage of thread time).

In one embodiment, the technology disclosed herein may include tracking usage in a sliding window, dividing time into windows (e.g., 5 minute windows) with maximum look back (e.g., look back of 30 minutes), aggregating usage within the same window for each message type, computing fair usage for each message type, estimating how long a message types has been waiting for threads by, for example, using a snapshot of the longest waiting messages which may be obtained using any number and type of system and performance monitoring tools, such as NAGIOS®, etc. NAGIOS refers to an open source application used for monitoring of system resources, network resources, system infrastructure, remotely-run scripts, etc. This is further referenced and described below, such as with reference to Measuring Latency and Fair Expected Usage. It may also include computation from when at least two message types are competing for threads and for each window it may compute expected usage for each message type, such as per the following function: 1) total thread time used by all message types during that window as thread capacity can vary over time; 2) fraction of time message type spent waiting for threads; 3) fairness is the difference between actual and expected usage; 4) partition message types by usage and latency; 5) latency victims: >20 minutes delay experienced; 6) usage victims: actual usage is below expected by 50%; 7) usage offenders: actual usage is above expected by 50%; 8) intervene if intersection of latency victims and usage victims is non-empty; 9) order message types by fair usage in listen list; and 10) exclusively victims use selective boosting of messages to provide additional MQ capacity.

Intervention

In one embodiment, an intervention technique is employed by having identification and intervention modules 214, 215 to address the problem of identifying, via identification module 214, and whether and when to intervene, via fair usage intervention trigger (also referred to as "intervention module" or simply "intervention trigger") 220. For example, usage-based fairness is enforced when two conditions are satisfied: 1) high system load as measured by one or more messages types experiencing extremely high latency (e.g., queuing times); and 2) heavily skewed usage toward a handful of message types (e.g., there is a problem that we need to correct). The aforementioned two conditions may be identified and described, via identification module 214, and then the solution for intervention is outlined and applied, via intervention trigger 220.

High Latency

High latency may refer to any message type in which the queuing time of the oldest message is greater than a defined amount of time, such as 20 minutes which serves as a configurable latency threshold. For example, of the aforementioned message types, those types that are not receiving their fair share of processing time on MQ thread are identified via identification module 214, which have either caused or exacerbated the latency experienced by their messages. Let latency victims be defined as any message type Mi with latency greater than 20 minutes. This is the set of potential victims that could trigger an intervention. Specifically, they may satisfy the two conditions above: experiencing high latency and deprived of their fair share of MQ thread time.

In one embodiment, the set of latency victims may be defined as those message types having a latency above the mean latency. Specifically, measurement and computation module 216 computes the mean latency of all message types that are experiencing high latency and identify, as victims, types whose latency is, for example, 50% above the mean. The intuition being that the focus is on messages whose latency is impacted most by system contention. While this approach is more conservative in identifying victims, it may result in false negatives such that intervention is warranted and applied, via intervention trigger 220, for a message type that is not included among the set of latency victims.

Consider the following scenario: message type M1 floods the queue at time 0. (here, the flood indicates that a large number of messages are enqueued at the same time). Subsequently, type M2 floods the queue at the 20-minute mark and type M3 floods the queue at the 40-minute mark. Then, at the one-hour mark, the corresponding latencies for M1, M2, and M3 are 60, 40, and 20 minutes, respectively. Let us also assume that from a usage perspective, M1 received more and M3 received less than its fair share of MQ thread time (M2 received exactly its fair share). In this case, the actual victim, M3, is below the mean latency because of when it was queued. For example, while latency measures wait time, it is also a function of when a message was queued. Thus, when the system is highly loaded, latency becomes more a measure of when a message was queued rather than a measure of the delay caused by competing message types.

Measuring Latency

Accordingly, in one embodiment, measurement and computation module 216 may measure latency for the age of the oldest message for each message type by relying on snapshots from, for example, NAGIOS for, for example, every 5 minutes. Exploiting measurements that are readily available in NAGIOS allow for minimizing the overhead of enforcing fair usage. This technique is novel and better than conventional techniques that incur significant overhead by updating latency on a more frequent basis or obtaining an exact count of the number of messages queued for each type and this is because conventional techniques do not offer efficient mechanisms to query for queue state and, as such, frequent database calls to determine what is present in the queue adversely impact overall system throughput.

In some embodiments, memcached is relied upon to distribute latency measurements from NAGIOS to various application servers in the dequeue cluster. For example, latency measurements may be obtained when NAGIOS pings one application server by calling a method/page (e.g., message QueueLongestWaiters.jsp). The corresponding application server may query for latency measurements, while the dequeue master thread on the remaining application servers may then launch a service every defined interval (e.g., 5 minutes) to detect when usage-based intervention may be triggered. This service may attempt to retrieve the most recent latency measurements from memcached and use this as an input to the intervention algorithm supported by intervention trigger 220, as referenced below with respect to the section Intervention.

Measuring Usage

In one embodiment, fair usage monitor (also referred to as "usage tracking module" or simply "monitor") 228 may be used to track and measure a message type's usage referring to the aggregate amount of time that the type occupied MQ threads for processing (e.g., sum of the processing time over all messages of that type). The fair expected usage is defined as the amount of usage that is considered fair for a given message type over a specific period of time. It is contemplated that this is not necessarily an even fraction of the total usage over all message types, because various types may be queued at different times and, therefore, exhibit different latencies. For instance, a message type Mi that has been waiting on the queue for a long time should not be penalized for usage incurred prior to the arrival of messages for type Mj.

Furthermore, messages may be segregated into three groups based on their usage, such as usage victims, fair users, and usage offenders. In a nutshell, usage victims refer to any messages types in which the actual measured usage is 50% below its fair expected usage over a given time window. Similarly, usage offenders are types whose MQ thread time exceeds 50% fair expected usage. Fair users are the remaining types. In one embodiment, 50% may be chosen as a threshold to prevent over-reaction due to small variances in usage during normal operation, although this threshold may be raised or lowered to relax or tighten fairness guarantees. Fair usage monitor 228 may be used for computing fair expected usage and the list of usage victims/offenders.

Intervention

As aforementioned, intervention trigger 220 may be used to decide whether and when to intervene based on two factors: 1) extremely high latency; and 2) heavily skewed usage. Latency victims ("LV") may include a set of latency victims (e.g., those types experiencing a delay of greater than a threshold time period, such as 20 minutes), where usage victims ("UV") may include a set of usage victims (e.g., that reach less than a threshold fair expected usage, such as 50% of the fair expected usage). The victim set may be computed, via measurement and computation module 216, as an intersection of LV with UV, where the victim set contains types of messages that experience both high latency and are deprived of their fair share of usage. If the victim set is not empty, then intervention is required and performed my intervention trigger 220. Further, a proof may be sketched as to the victim set contains neither false positives nor false negatives based on the definition. A false positive means that a victim type is either not experiencing high latency (not in LV) or receiving its fair expected usage (not in UV). This case may be excluded by the set intersection property. A false negative may mean that an actual victim is not in the victim set, whereas, by definition, the actual victim may be present in both LV and UV.

If no types experience high latency, no intervention may be needed. If only a single type experiences high latency, then no intervention may be needed. If two or more type experience high latency, then intervention may be needed if at least one type falls below 50% of fair expected usage. If subsets of types experience high latency, intervention based on all types with messages in the queue may be needed. Specifically, types with latency greater than 20 minutes and types with latency less than 20 minutes but greater than 0. A latency victim may be computed from the former types while usage victims may be computed based on both types.

Similarly, subset of types are experiencing high latency but message types that have zero or low latency may be regarded as grossly exceeding its fair expected usage. For example, this may occur for long running types that queue one message at regular intervals (as opposed to queuing a group of messages at one time) and finish within a threshold period of time, such as 5 minutes (e.g., it does not show up in NAGIOS). For example, consider the case in which M1 are short dashboard requests that flood the queue at time 0 and each message takes 30 seconds to complete. M2 are long-running asynchronous application programming interface (API) messages that take another time period, such as 4.5 minutes, to run, but only a single asynchronous API message is submitted every five minutes.

With a single MQ thread, each of one dashboard and an asynchronous API message may run every 5 minutes; however, when the latency is measured, M2 may return zero because all its messages may complete within the 5-minute window. If M2 is not accounted for, when computing the usage victims, then intervention may not be needed even if M1 is experiencing high latency and is receiving less than 20% of its fair expected usage (10% usage when it should have received 50% usage). Further, message types may be included with zero or low latency in the usage calculation if they exceed the fair expected usage of high latency message types. Similarly, subsets of types are experiencing high latency but message types that have zero or low latency are below its fair expected usage. Since these messages are experiencing low latency, no intervention may be needed.

Set Difference Intervention

The computing of the victim set as a set difference between LV and UO (UO is the list of usage offenders as defined above) means subtracting the message types which are hogging MQ thread resources from high latency types to compute the set of messages that, if not empty, indicate that intervention is necessary. One technique is to subtract usage offenders and fair users from the latency victims set, which is equivalent to the intersection between latency victims and usage victims (since latency victims contains the high latency types, which is a subset of the union of usage offenders, fair users, and usage victims).

Sliding Window Maintenance

As will be further illustrated in this document with respect to the subsequent figures, MQ thread time usage is tracked by fair usage monitor 228 by maintaining counters for the total-processing time consumed by each message type. In one embodiment, this is accomplished by tallying, for each completed message, the processing time for the corresponding message type using measurement and computation module 216. To implement this, sliding window digest (also referred to as "sliding window module") 226 is used to employ a configurable sliding window to work with measurement and computation module 216 to take coarse-grained usage measurements within each window such that 1) to ensure that intervention decisions are based on the most recent usage pattern, 2) to smooth out temporary fluctuations in usage across a span of time for long running message types, and 3) to identify message types that exceed its fair expected usage on a chronic basis over a sufficiently large time range. The coarse-grained measurements may be obtained by aggregating usage statistics within each window to minimize the overhead of maintaining a large number of measurements for the sliding window in memory.

In one embodiment, the sliding window technique includes partitioning time into disjoint and equi-sized (with respect to time) windows in which each window is a segment in time with a beginning and end. For example, let Wi be the window in which beg(Wi) denotes the start of time and end(Wi) denotes the end time for the window. Next, let the window extent be the size of the sliding window in terms of the number of windows that make up the sliding window. Although it is contemplated that the time may be sliced into any number of intervals and the sliding window may consist of any number and size of windows, for the sake of brevity and ease of understanding, let us suppose the time is partitioned into 5-minute intervals and for a window extent of 6, the sliding window may consist of 6 windows (an ordered list of windows W1 through W6) that span the last 30 minutes in time. For example, if the current time is 5:00 PM, then window W1 covers 4:30 PM-4:35 PM, while W6 covers 4:55 PM-5:00 PM. In general, a sliding window with size m (W1 through Wm) covers that last end(Wm)–beg(W1) minutes in time where end(Wi)<=beg(Wj) for all i<j. Similarly, another example is illustrated with respect to FIG. 3A.

Tracking Usage

In this section is described how to compute the fair expected usage for each message type using latency snapshots from NAGIOS and sliding window usage measurements, and then how to determine the set of usage offenders, usage victims, and fair users.

Fair Expected Usage

Fair expected usage is the amount of MQ thread time that is allocated to a message type given the amount of competition for resources from other types and the amount of available MQ threads. It is contemplated that the definition of fairness may vary by message type. For example, if only messages from type M1 are pending in the queue, then fair expected usage for M1 may be 100% of the available MQ threads. In contrast, if messages from both M1 and M2 are waiting in the queue, then the fair expected usage for M1 may be 50%. Fair usage may also depend on the amount of MQ threads available (via addition or removal of application servers or threads), such as if M1's fair expected usage is 10 minutes during one usage window, but the number of MQ threads is halved during the next window, then M1's fair expected usage changes accordingly.

To approximate the fair expected usage, one or more of factors may be considered and taken into account. First, messages are enqueued at different times and so the message types may not be penalized for waiting longer on the queue; for example, consider the case in which type M1 floods the queue at time 0. Over the next 20 minutes, messages from M1 slowly drain from the queue and accumulate usage. If another message type M2 floods the queue at the 20-minute mark, M1 may not be penalized for usage incurred during the first 20 minutes. Second, message types that are waiting on the queue based on the usage of types that no longer have pending messages may not be penalized; for example, consider the case in which type M1 used 90% of the MQ thread time during the previous window while type M2 used only 10%. When the latency snapshot is retrieved, M2 may no longer have pending messages and in this case, M1 may not be penalized because, without messages, M2 may not be starved going forward. To add to the previous observation, the fair expected usage may be based on those types that have messages pending on the queue. Further, using intervention trigger 220, an appropriate and timely fair usage intervention is performed and to ensure that an equitable distribution of MQ thread time among these message types is performed using enforcement module 230 which is responsible for prioritization, distribution, and enforcement. In one embodiment, the fair usage is based on the interaction between the types with pending messages as opposed to the types without any pending messages as this distinction may be considered and used when calculating the usage for the sliding window.

Time Span of Interest

In one embodiment, a recent subset (referred to as "time span of interest") of the usage measurements within the sliding window may be relevant to computing the fair expected usage. This time span of interest may be computed based on latency snapshots from NAGIOS using the usage monitoring and tracking tool referred to as fair usage monitor 228. The technique primarily focuses on the fair usage for messages waiting on the message queue, which means that for a given message type, tracking the usage since the enqueue time of its oldest message (bounded by the size of our sliding window) may be sufficient and since latency measures the amount of time a message have spent waiting for MQ thread resources, the enqueue time may be derived from the known latency.

Let us suppose Ti denotes the enqueue time of the oldest message for type Mi and if Ti is less than the lower bound on our sliding window (Ti<beg(W1)), then the usage for Mi is tracked over the entire sliding window; otherwise, the usage tracking starts for window Wi satisfying beg(Wi)<=Ti<=end(Wi). The time span of interest may be narrowed even further, such as if only the messages for a single type are pending in the queue, then no intervention may be necessary, and thus, the technique starts tracking usage when the oldest message for at least two types are pending during the same window. To compute the fair expected usage and actual usage for each message type, measurement and computation module 216 may sum up the individual values for each window (within the time span of interest) as follows: for M1, actual(UI)=25+20+15+15=75 min, expected(UI)=19+15+11+7.5=52.5 min, while similar calculations are performed for M2, M3, M4 and so forth.

Usage Victims, Usage Offenders, Fair Users

As aforementioned, a set of usage victims, usage offenders, and fair users may be computed. The set of latency victims may include any type with latency greater than a threshold time period, such as 20 minutes, where the set may contain {M1, M2}. For example, the usage victims may include any type Mi in which the actual usage is 50% below its fair expected usage ((expected(Ui)−actual(Ui))/expected(Ui)>50%). Next, the starvation fraction is computed such that each type in the above example is experience with respect to usage, such as M1: (52.5−75)/52.5=−43% and so on for M2, M3, M4, etc. If starvation is equal to 0, then the message type is using its fair share of MQ thread time. For values greater than zero, the messages from that type are below their fair share, while values less than zero indicate above fair share usage. Given our 50% threshold, our usage victims, usage offenders, and fair users are {M2}, { }, and {M1, M3, M4}, respectively. Note that in this particular example, there are no usage offenders but there are victims. This is because the combined effect of multiple messages types (notably M1 and M4) exceeding their fair expected usage deprived M2 of its fair share of MQ thread time.

Intervention

When considering fair use intervention, intervention trigger 220 working with other components (such as measurement and computation module 216, fair usage monitor 228, etc.) starts by determining when to intervene, which is illustrated by the pseudo-code below (for example):

```
ListenList_Intervention(LatencyByType, SlidingWindowUsage)
    Latency_Victims = { }
    foreach type in LatencyByType
        if LatencyByType(type) > 20 minutes
            Latency_Victims = Latency_Victims U type
    Actual_Usage = computeActual(LatencyByType,
        SlidingWindowUsage)
    Expected_Usaged = computeExpected(LatencyByType,
        SlidingWindowUsage)
    foreach type in Latency_Victims
        if (Expected_Usage(type) − Actual_Usage(type)) /
            Expected_Usage(type) > 50%
            Intervention = TRUE
            Intervention = FALSE
```

The above decision may be re-evaluated, such as every 5 minutes, following the most recent latency snapshot obtained from NAGIOS. The inputs are the latency for the list of types with non-zero latencies and the usage measurements that are maintained over the sliding window. The process begins with initializing the latency victims set to null and then, for each type with greater than a threshold time period, such as 20 minutes, in latency, they are added to the latency victims set. Then, the actual and fair expected usage for each message type are calculated based on the available latency information and the sliding window usage measurements, where for each message with greater than 20 minute latency, if a usage victim is found, then the intervention is triggered. Once intervention is triggered, enforcement module 230 may consider a combination of two methods or processes for enforcing fair usage: such as 1) listen list shuffling; and 2) selective boosting.

Listen List Shuffling

Once intervention has been triggered by intervention trigger 220, a listen list (e.g., advance queue (AQ) listen list by Oracle®) may be sorted as follows: for types with zero latency, their random shuffling is performed and their placed at the beginning of the listen list. For all other message types, the usage starvation fraction ((expected(Ui)−actual(Ui))/expected(Ui)) is computed and ordered in decreasing starvation order. For example, the pseudo-code for ordering the listen list on each listen call may be as follows:

```
Order_ListenList(MessageTypes, LatencyByType, SlidingWindowUsage)
    If Intervention == FALSE
        return shuffle(MessageTypes)
    Else
        Usage_Starvation = { }
        Zero_Latency = { }
        Actual_Usage = computeActual(LatencyByType,
            SlidingWindowUsage)
        Expected_Usage = computeExpected(LatencyByType,
            SlidingWindowUsage)
        foreach type in MessageTypes
            If LatencyByType(type) > 0
                Starvation = (Expected_Usage(type) −
Actual_Usage(type)) / Expected_Usage(type)
                Usage_Starvation = Usage_Starvation U (type,
                    Starvation)
            Else
                Zero_Latency = Zero_Latency U type
        ListenList = shuffle(Zero_Latency)
        Sorted_Usage =
        SortByStarvationDecreasing(Usage_Starvation)
                return ListenList.append(SortedUsage)
```

The aforementioned may take the list of message types to listen for, latency snapshot, and sliding window usage measurements as input and return an ordered list of message types. If intervention is not triggered, then a random shuffle is performed. Otherwise, the types are separated into non-zero latency and zero latency groups. For the zero latency types, a random shuffle is applied and the latency types are place at the beginning of the listen list. For all other types, usage starvation fractions computed, and the remaining types are sorted by decreasing starvation order and appended to the end of the listen list. Further, the intervention logic may be local to each dequeue thread; namely, each dequeue thread may maintain its own sliding window usage measurements. This way, no cross application server coordination is needed to share the state between multiple dequeue threads; instead, each dequeue thread may make an intervention and apply listen list shuffling decisions independently by tracking the usage locally.

Selective Boosting

In one embodiment, a second method for intervention includes modification of the existing boosting logic that dynamically adds or removes certain threads when specific message types may experience increased latency. Specifically, more dequeue threads may be added to relieve these types by assigning booster permits (such as types with higher delay are assigned more permits). When the listen list is constructed, those types that are assigned booster permits may be positioned at the front of the list and thus have a higher likelihood of being serviced.

Once intervention is triggered, the boosting may run counter to the goal of achieving fair usage across all types. For example, consider the case in which a usage offender is also a latency victim such that booster permits are assigned to this offender. By virtue of being a usage offender, it should be ordered at the bottom of the listen list; however, any booster permits superseding any listen lists to ensure that this usage offender is moved to the front of the listen list, thus continuing to starve other types. Using this technique, booster permits are issued as before and, at the application server level, booster permits are ignored in constructing the listen list if the permits belong to usage offenders. This also ensures that fair usage intervention does not interfere with the addition of more servers in the dequeue cluster when incoming messages are experiencing high latency.

For example, consider the case on CS0 with an asynchronous API messages starving dashboard and other requests. In this case, a flood of asynchronous API messages increases latency for all messages in the queue and, as such, both asynchronous API and dashboard messages receive boosting permits. While there is increased capacity, dashboards continue to be deprived of the additional MQ thread time from boosting. However, if booster permits for asynchronous API (e.g., the usage offender) are ignored when constructing the listen list, then the additional threads may be relied upon to increase the MQ thread time made available to dashboard requests. By not changing how booster permits are issued, and instead, selectively ignoring permits at application servers, MQ thread capacity may be increased (since the number of outstanding permits dictate the number of additional threads made available) and quickly made available to the usage victims. Further, the boosting code may be augmented with additional logic to enforce fair usage, when intervened, by filtering out usage offenders. Here, for example, permits are not filtered if intervention has not been triggered; otherwise, whether the message type for the corresponding permit is a usage offender based on actual and expected usage is computed. If a permit corresponds to a usage offender, then the permit is ignored when constructing the listen list.

A pseudo-code is presented below (for example):

```
BoosterPermit permit = getNextPermit( )
if permit != null AND isNotUsageOffender(permit.messageType) then
    listenList.remove(permit.messageType)
        listList.add(boosterPosition, permit.messageType
```

Concurrency Controlled Message Types

In one embodiment, concurrency controlled message types include single threaded messages including types with explicit (e.g., org-based) concurrency controls, and types with resource constrained filters that prevent them from making use of all available MQ threads. Since these types intentionally limit their concurrency, the usage metric (e.g., MQ thread time used) may disproportionately favor these messages. Consider a single threaded type that can only execute one after another, the messages waiting on the queue that cannot run due to the single thread requirements (rather than not having enough MQ threads) accrue high latency. This, combined with low usage, consistently results in single threaded messages being treated as usage victims even though they are not starved. However, in this case, nothing is done as these messages are automatically removed from the listener list due to concurrency control.

Ordering of the listen list during intervention may include concurrency control and thread capacity as a parameter, because the tighter the concurrency control limits, the less likely that a type is marked as a latency victim. For example, assuming 5 minutes being the threshold for latency victims, if there are 16 threads available for a message type on a node, but the message type has a concurrency limit of 8, then the latency victims threshold for that type is set to 5×16/8, whereas for the types with no concurrency limits or in which concurrency is equal to the number of threads available, the 5 minute latency threshold remains unchanged Furthermore, a logging technique may be employed for maintain a log of various activities, such as logging every time a message type is suspended for any reason (e.g., resource constrained filter, concurrency limits, single thread, etc.). In one embodiment, the logging technique may include a lazy message queue technique that indicates every event (e.g., too many requests at a database, the host running out of memory, the host central processing unit (CPU) utilization is too high, etc.) in which a worker host detects a resource issue and if and when one of these event occurs, the worker host may stop processing any number and type of messages or jobs from the queue. The events may be termed as lazy message queue events. This way, the number of times that a particular message type appears in the log is parsed, while the expected usage is adjusted based on its log frequency. This technique handles the concurrency controlled types naturally by adjusting the usage calculations and without having to rely on fixed latency or usage thresholds, which may vary by production instance. The first approach may favor concurrency-controlled types in listen list and the issuance of booster permits, whereas the second approach relies on fixed latency and capacity thresholds that can be brittle in production.

In calculating the usage for concurrency controlled types, it is ensured that the low usage by these types does not penalize other, non-concurrency controlled types. To accomplish this, each time a dequeued message cannot be processed, it triggers the log. The number of times this occurs for each message type (e.g., deferral count), the usage for a concurrency controlled message type Mi is tallied during window Wj, while the total number of messages processed versus the number of messages deferred is accounted. For example, 10 messages are dequeued for Mi, but only 2 messages are processed while the remaining 8 are suspended due to concurrency-controlled reasons. Stated differently, dequeue threads give Mi opportunity to process 10 messages, but it only processed 2, which means choosing to use only 20% of its allocated resources. In this case, even if Mi used fewer resources than other types, the expected usage for Mi is safely adjusted downward by setting its fraction (e.g., amount of time spent competing for resources) f(Mi, Wj) to 0.2, reducing the fair expected usage of Mi without adversely effecting other types. When contention is low, suspension of Mi messages may occur more frequently and its expected usage will be adjusted downward more aggressively. However, during high load, when many messages are competing, Mi may not encounter suspension at all, and in turn, its expected usage may not be adjusted.

Adjusting usage in this manner may mark concurrency-controlled types as usage offenders in some cases. For example, logs may be triggered more frequently when system load is low and the stand-by delay specified by the message handler is low. Thus, if the concurrency controller type is using more than its expected usage, then no adjustment may be necessary. If the message type is a usage victim, then the usage using the technique above (e.g., account for number of the logs) is adjusted. If the type's actual usage is more than the new, adjusted expected usage, then this may indicate that the log is too conservative (e.g., underestimates the amount of resources used by the message type) and, as such, the fraction, such the concurrency controlled type's expected usage matches its actual usage, is revised. To summarize, when a concurrency controlled type is a usage victim, its expected usage is revised downward so that it is less likely to be a usage victim. However, the revision does not change the type, such from a usage victim to a usage offender. During intervention, single threaded types may not be consistently ordered at the front of the listen list as it is less likely to become a usage victim given that its expected usage is likely to be much lower compared to the other types. With regard to the issuance of booster permits, both usage offenders and concurrency controlled types (e.g., types that experienced message suspension) are excluded from receiving boosters.

Conditions for Filtering Types

In one embodiment, message types may be filtered out of the listen list for additional reasons irrelevant to user-specified concurrency limits, such as: 1) resource constrained filters such as database central processing unit (CPU) becoming overloaded; 2) piggy backing behavior for POD-wide single threaded types (e.g., usage_log_search type) in which a thread holds the lock for the corresponding type and remove the type from the listen list of competing threads; 3) peek and browse the behavior in which a dequeued type may not be processed because no unexpired messages are found in the cache; and 4) user-specified POD or a node-based suspension rules that prevent any messages of a given type from being dequeued. The scenarios may be addressed in the same manner in which concurrency controlled message types are handled, such as via the logs. Specifically, each of the listed conditions may generate a corresponding log line for the effect message type, where each Mlog line is tallied in the sliding window by incrementing the frequency in which the dequeued messages are not to be processed. This count is used, in turn, to adjust the usage of the filtered types so that they are not falsely identified as usage victims.

Starvation by Low Latency Types

In some embodiments, types that submit a small number of messages on a continuous and periodic basis and grossly exceed its fair expected usage are accounted for, where, as mentioned above, types without any messages queued in the fair usage calculation may not be accounted, so that the focus remains on types with high latency messages (as opposed to those messages that are already completed). In some embodiments, in a case where a zero latency type starves a type experiencing high latency, booster permits may prevent this problem by being allocated to only the types experiencing high latency. However, with respect to listen lists where zero latency messages may be consistently ordered in the front and their usage is not accounted for, the usage measurements from zero latency types (that incurred recent usage) may be included in ordering the listen list. The recent usage may be defined as any zero-latency type that incurred usage in the current or previous window (e.g., a span of two windows) and to compute this list, the zero latency types are iterated and their actual usage is measured starting from the current and previous time window.

A couple of factors may be considered when accounting for zero latency types, such as 1) the usage of zero latency types that exceed its fair share, but 2) do not penalize non-zero latency types for zero latency types that rarely submit messages and have negligible impact on overall usage. In one embodiment, a set of potential usage offenders is constructed from zero latency types with non-zero usage in the two most recent windows, where for each type from this list, its usage from earlier windows (up to the beginning of the time span of interest) is included if the usage for that type is consecutively non-zero. In another embodiment, usage from earlier windows is included if up to that point, usage incurred by the zero-latency type exceeds its expected fair usage. For example, considering the decision to add usage from window Wi in computing a zero-latency type Mj's usage, if the cumulative usage from window W0 to Wi exceeds the expected usage (as calculated earlier) of a non-zero latency type whose oldest message was enqueued at window Wi, then Wi is included in Mj's usage. For example, for each window Wi, the expected fair usage of non-zero latency types is computed whose oldest message was enqueued at Wi. Given the fSum(Wi) is the fair fraction over window Wi, and uSum(Wi) is the total usage for non-zero latency types, the expected fair usage over the entire window is represented by uSum(Wi)/fSum(Wi). The sum is calculated over all windows in which we measure actual usage for zero latency types. Subtracting fair usage from actual usage for zero latency types yields the starvation factor. A negative starvation factor means that a zero latency type used more MQ thread time relative to a type with non-zero latencies. For these zero latency types, their usage is included in the computation of fSum(Wi) and uSum(Wi) as this adjusts the fair expected usage of non-zero latency types upward such that the additional non-zero latency types may now be marked as usage victims.

Moreover, in case where the zero latency types are usage offenders, the expected usage of high latency types may be adjusted accordingly. For example, the expected usage for non-zero latency types may be computed, as aforementioned, except here, the usage for zero latency types (relative to non-zero latency types) is also computed. The zero latency types that exceed their expected usage are marked as potential usage offenders, where the expected usage for non-zero latency types is revised by taking into account the potential usage offenders from the zero latency groups. If a zero latency type is using more than its fair share of MQ thread time, then this adjusts the expected usage of non-zero latency types upward and increases the likelihood that a given type is identified as a usage victim. The revised expected usage is then used to compute the usage victims. The revised pseudo-code includes (for example):

```
ListenList_Intervention(LatencyByType, SlidingWindowUsage)
    Latency_Victims = { }
    foreach type in LatencyByType
    if LatencyByType(type) > 20 minutes
    Latency_Victims = Latency_Victims U type
    Actual_Usage = computeActual(LatencyByType,
    SlidingWindowUsage)
    Expected_Usage = computeExpected(LatencyByType,
    SlidingWindowUsage)
    Zero_Latency_Starvation =
    computeZeroLatencyStarvation(LatencyByType,
    SlidingWindowUsage)
    Zero_Latency_Offenders = { }
    foreach type in Zero_Latency_Starvation
    if Zero_Latency_Starvation(type) < 0
    Zero_Latency_Offenders = Zero_Latency_Offenders U type
    If Zero_Latency_Offenders is not NULL
    Expected_Usage = computeExpectedRevised(LatencyByType,
    SlidingWindowUsage, Zero_Latency_Offenders)
    foreach type in Latency_Victims
    if (Expected_Usage(type) – Actual_Usage(type)) /
    Expected_Usage(type) 50%
    Intervention = TRUE
        Intervention = FALSE
```

Consider two scenarios. In one M1 floods the queue at 0 minutes. Type M2 submits one message every few minutes but never incurs a backlog and, hence, returns zero latency from NAGIOS. Now imagine that at time 20 minutes, M1 used 2 minutes of the MQ thread time during the last 20 minutes while M2 used the remaining 18 minutes. Using the revised algorithm, the expected usage of M1 is computed as 2 minutes. Moreover, if M2 (zero latency type) are used more than the expected usage of M1 (non-zero latency type), both M1 and M2 are combined in the usage calculation which yields an expected usage of 10 minutes for both M1 and M2, which then triggers intervention by intervention trigger 220. Now consider the reverse scenario in which at the end of 20 minutes, M1 has used 18 minutes while M2 has used the other 2 minutes. Here, since it is not known how long M2 messages have spent waiting on the queue, M1 is not penalized for it and given that M2 is below M1's expected usage, intervention is not triggered.

In some embodiment, the longest waiter latency measurements may be exposed to any number of application servers by caching the results in memcached. Further, the intervention may be passive, merely logging problems with usage when intervention is triggered in production. In one embodiment, a dashboard page may be designed to monitor for past and current intervention decisions by mining for data from splunk, which allows for monitoring of intervention in production and fine tune parameters to reduce noise as necessary. Interventions may be further implement through selective boosting of message types or by reordering types within the listen list. Further a central hub page may be included to enable/disable fair usage intervention on a per POD or node basis.

Suspension of Fair Use

In one embodiment, a blacktab page is created that allows for suspensions of fair usage intervention and usage tracking on, for example, a per-rac node basis, where each rac node is listed separately with an option to "suspend" along with the reason for suspension. When a rac node is marked for suspension, a corresponding suspend rule is inserted into a (e.g., BASS.message_queue_suspend_data table) with certain attributes, such as a) suspend mode (rac_fair_usage), b) rac node, c) suspend reason, d) suspend date, e) org, and f) user identification (Id).

When a suspension rule is removed, the corresponding row is deleted from the table (e.g., message_queue_suspend_data table), which means that metadata associated with the change (e.g., suspend date, reason, org, and user Id) is lost along with the suspension rule. Accordingly, using the above, valuable computation time may be saved and allow for embodiments to be well-suited to be used with 1) devices with a small form factor, limited interactive capability, limited display size, limited memory or storage capacity, limited processing power and short battery life; 2) networks that are not consistently available, slow data transfer rates, erratic data transfer services, no consistent standards; 3) data having massive quantity and that is not organized for mobile users; 4) users that have short attention spans, little or no patience, on the move, and routinely in awkward or limited usage situations; and 5) managers who have security concerns and where applications, devices, and users require a new management layer.

Figure 3A:
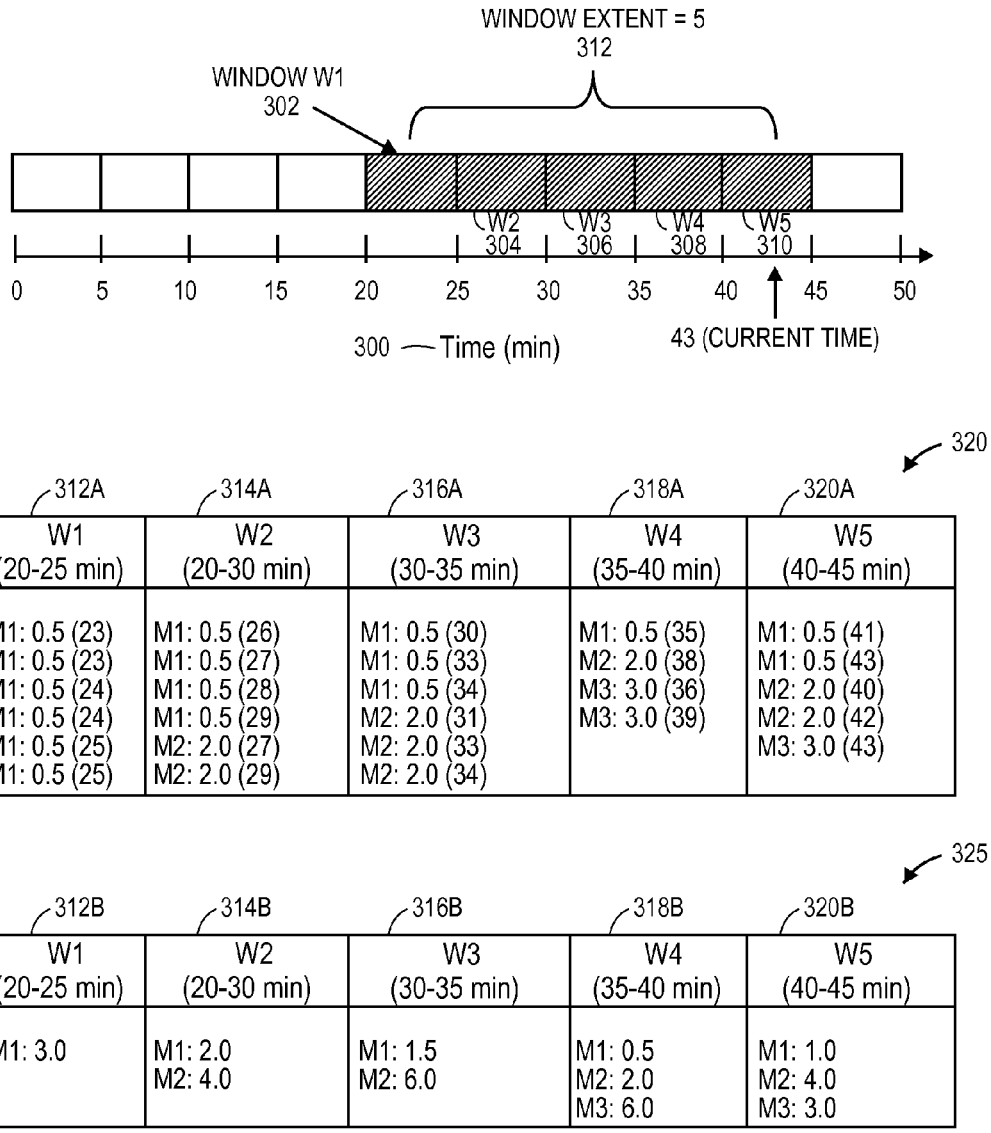
FIG. 3A illustrates a fair allocation and usage of thread resources using sliding window maintenance as provided by the thread resource management mechanism of FIG. 1 according to one embodiment.

FIG. 3A illustrates a fair allocation and usage of thread resources using sliding window maintenance as provided by the thread resource management mechanism 110 of FIG. 1 according to one embodiment. In the illustrated embodiment, time sequence 300 is divided into several windows a window extent 312 of fives windows 302-310 is adopted, where each window is based on a period of 5 minutes, such as W1 302 over minutes 20-25, and so forth. Table 320 reflects the distribution of user-placed jobs/requests/messages, M1-M3, where M1 runs from the $23^{rd}$ minute of W1 302 until the $29^{th}$ minute of W2 304 as shown in columns 312A and 314A. Similarly, timespans of messages M2 and M3 are shown in columns 316A-320A corresponding to windows W4 306-W5 310. Table 325 shows a cumulative timespan of messages M1-M3, such as M1 consumes 3 minutes in W1 302 as shown in column 312B and another 2 minutes in W3 302 as shown in column 314B. Similarly, cumulative timespans of messages M2 and M3 are shown in columns 316A-320A corresponding to windows W4 306-W5 310.

Figure 3B:
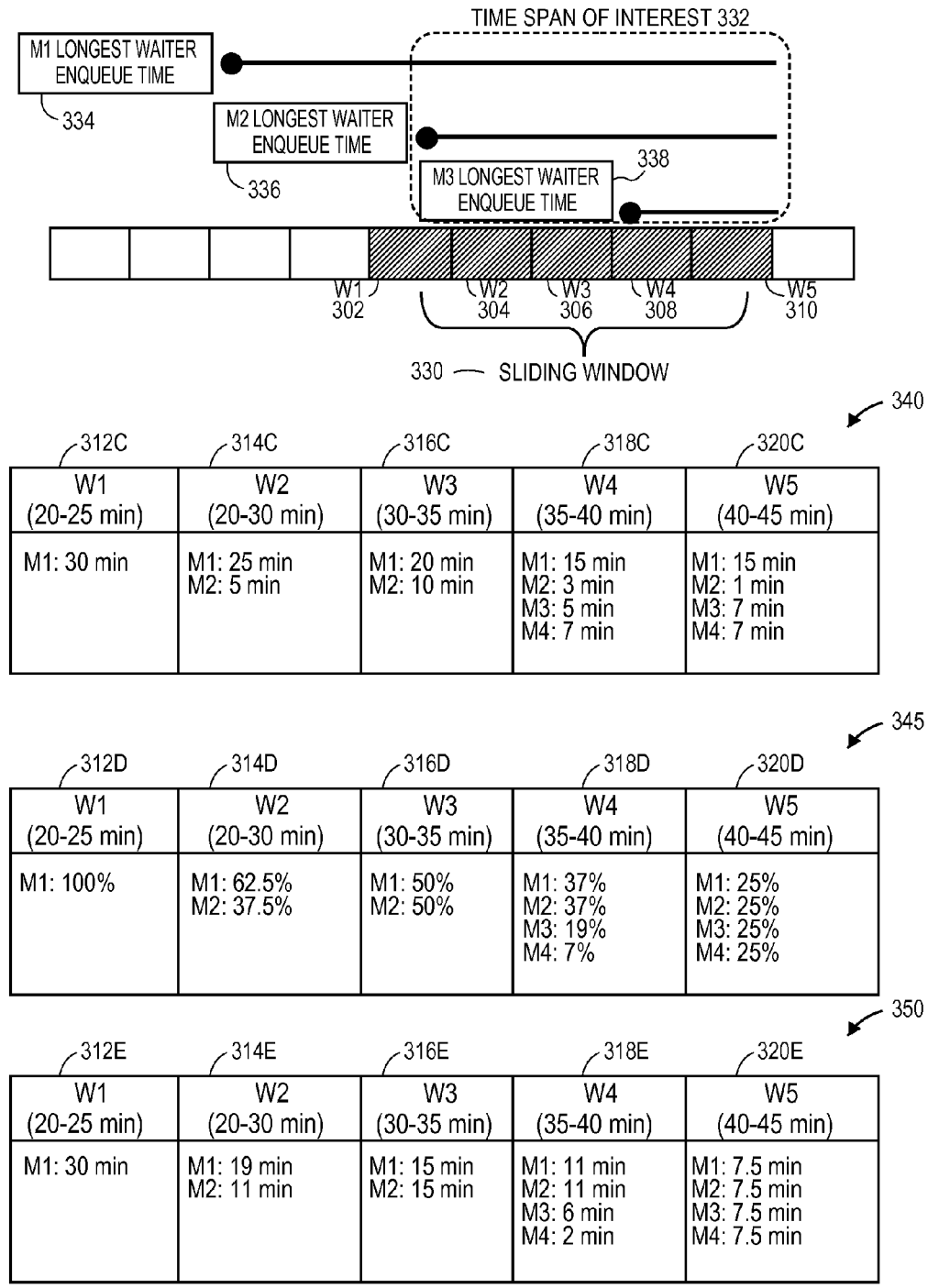

Referring now to FIG. 3B, it illustrates the use of a sliding window 330 including 5 windows, W1 302-W5 310, which corresponds to size over which window extent 312 is maintained in FIG. 3A. Further, as shown in FIG. 3A, the initial point in time is shown at the $23^{rd}$ minute, while the current time is shown to be at the $43^{rd}$ minute; similarly, here, time span of interest 332 is shown to represent that time period between the $23^{rd}$ and the $43^{rd}$ minute and is further shown to be moving to the right. Windows that fall outside this range are discarded for the purposes of the sliding window technique. It is contemplated that embodiments are not limited to this illustrated example and that the use of technology disclosed herein should not be taken as limiting or preferred. This example sufficiently illustrates the technology disclosed without being overly complicated. It is not intended to illustrate all of the technologies disclosed.

To track the usage for a given message type, for each window, the processing time used by all messages of that type is summed. Further, the span of each window is reduced to obtain finer grained usage measurements if necessary. Now, let WiUj denote the total processing time used by all messages of type Mj whose completion time t satisfies beg(Wi)<=t<end(Wi). To make the example concrete, consider the processing time of three messages, M1 334, M2 336 and M3 338, over five time windows, W1 302-W5 310. The first number denotes the processing time in minutes while the number in parenthesis denotes the wall clock time of when the message completed.

To implement the sliding window technology, a fixed sized circular array of time span of interest 332 is employed with the earliest window, W1 302, as the head and the most recent window, W5 310, as the tail window. Within each window 302-310, the total processing time is tracked for each message type using a hash structure using fair usage monitor 228 and sliding window digest 226. When sliding window 330 is advanced, the previous head (e.g., the earliest window, W1 302) is overwritten, while the head and tail pointers are advanced accordingly. The corresponding tables 340, 345, 350 illustrate the numbers that represent fair usage distribution as facilitated through sliding window 330.

For example, table 340 shows the actual usage tracking by minutes, such as column 312C shows M1 334 occupying 30 minutes, while column 314C shows M1 334 further occupying 25 minutes and M2 336 occupying 5 minutes. Similarly, columns 316C, 318C, 320C shows the actual usage of minutes corresponding to other messages, such as M2 336, M3 338 and M4 corresponding to windows, W3 306-W5 310. Table 345 includes columns 312D-320D that further illustrate fair usage fraction by percentage for each of the aforementioned messages, M1 334, M2 336, M3 338, M4-M5, and windows, W1302-W5 310, such as M1 334 at 100% in W1 302 in column 312D, M1 334 at 62.5% and M2 336 at 37.5% in W2 304 in columns 314D. Table 350 includes columns 312E-320E illustrates the fair expected usage by window 302-310 in terms of minutes that corresponds to the percentages of table 345, such as M1 334 at 30 minutes in W1 302 of column 312E, M1 334 19 minutes and M2 336 11 minutes in W2 304 in column 314E, etc.

Figure 3C:
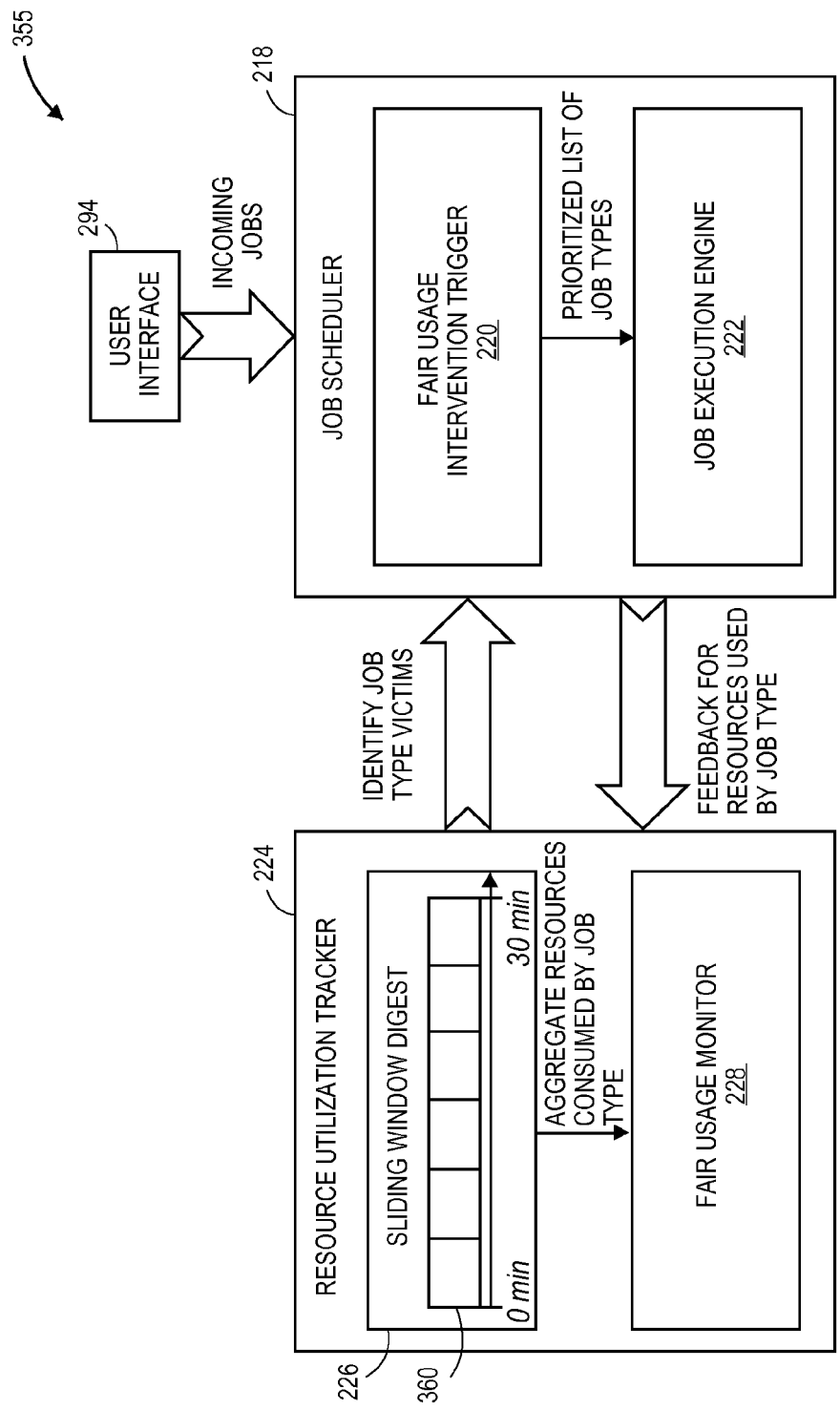
FIG. 3C illustrates architecture for facilitating a fair allocation and usage of thread resources using sliding window maintenance as provided by thread resource management mechanism of FIG. 1 according to one embodiment.

FIG. 3C illustrates architecture 355 for facilitating a fair allocation and usage of thread resources using sliding window maintenance as provided by thread resource management mechanism 110 of FIG. 1 according to one embodiment. In the illustrated embodiment, in architecture 355, jobs or message may be placed by users via user interface 294 provided by a client computing device in communication with a server computing device hosting the thread resource management mechanism 110 of FIG. 1. In one embodiment, messages/jobs received at job scheduler 218 are tracked by fair usage intervention trigger 220, where the jobs/messages are then prioritized into a prioritized list of job types that are then executed by job execution engine 222 of FIG. 2. The information, including the feedback for resources used by job type, is forwarded on to resource utilization tracker 224 of FIG. 2.

In one embodiment, at resource utilization tracker 224, sliding window digest 226 as powered by sliding window maintenance logic 252 of FIG. 2, provides the maintenance and use of sliding windows, such as sliding window 360, as illustrated with respect to FIG. 3B, in combination with the fair usage statistics as obtained by fair usage monitor 228, generates a report having aggregated resources consumed by job/message type. Using the aggregated resource consumed by job/message type, job/message type victims are identified and reported out to job scheduler 218 so that proper intervention may be triggered by fair usage intervention trigger 220 and job/message may be performed using job execution engine 222 using the prioritized list of job/message types.

Figure 4A:
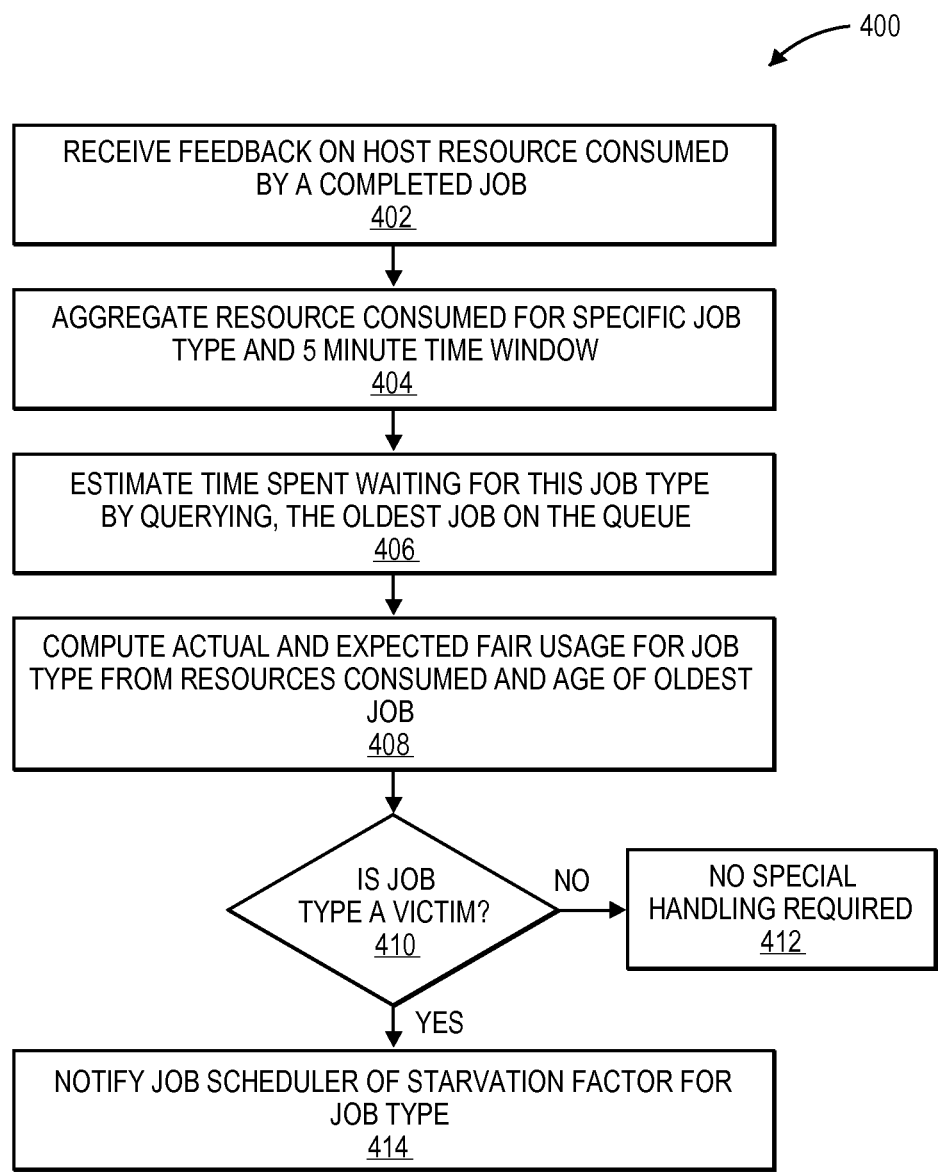
FIG. 4A-4B illustrate methods for facilitating a fair allocation and usage of thread resources for user messages according to one embodiment.

FIG. 4A illustrates a method 400 for facilitating a fair allocation and usage of thread resources for user messages according to one embodiment. Method 400 may be performed by processing logic that may comprise hardware (e.g., circuitry, dedicated logic, programmable logic, etc.), software (such as instructions run on a processing device), or a combination thereof. In one embodiment, method 400 may be performed by thread resource management mechanism 110 of FIG. 1.

Method 400 relates to and describes a resource utilization tracker transaction involving resource utilization tracker 224 of FIG. 2. Method 400 begins at block 402 with resource utilization tracker 224 of FIG. 2 receiving feedback on host resource consumed by a completed job/message. At block 404, resources consumed for or by a specific job type are aggregated using a sliding window that run across a defined time period threshold, such as 5 minutes. At block 406, the time spent waiting for the job type is estimated by querying the oldest job in the queue. At block 408, the actual and expected fair usage for the job type from resources is computed from and using resources consumed and the age of the oldest job. At block 410, a determination is made as to whether the job type is a victim. If the job type is not a victim, at block 412, no special handling is required and the process continues normally. If, however, the job type is determined to be a victim, at block 414, job scheduler 218 of FIG. 2 is notified of the starvation factor for that particular job type.

Figure 4B:
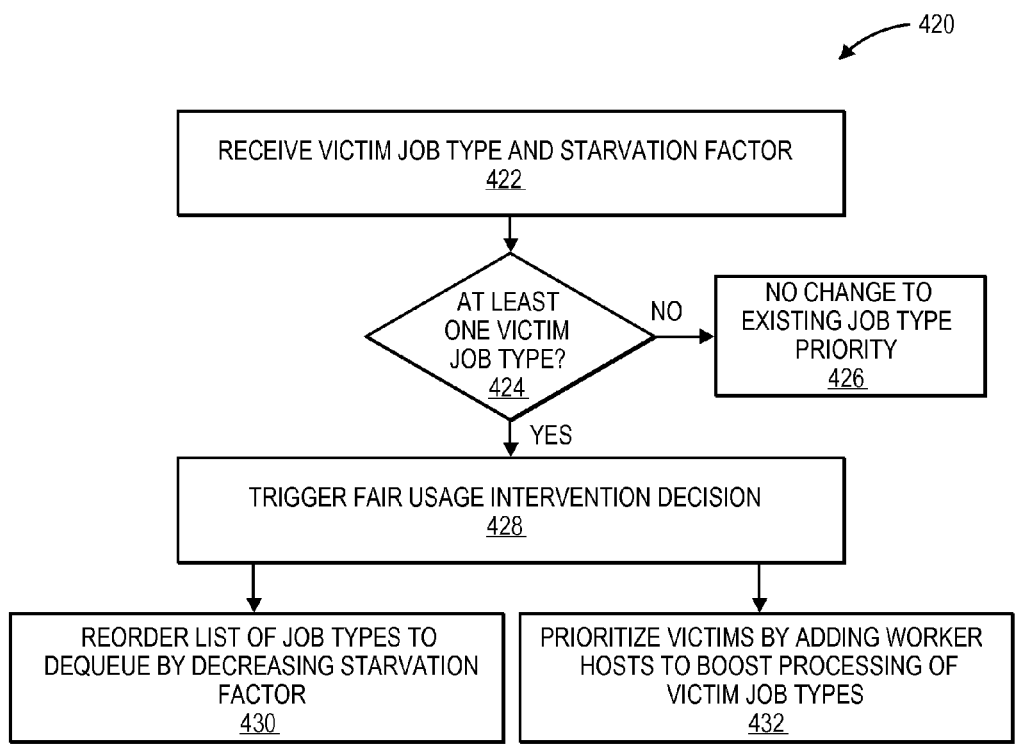

FIG. 4B illustrates a method 420 for facilitating a fair allocation and usage of thread resources for user messages according to one embodiment. Method 420 may be performed by processing logic that may comprise hardware (e.g., circuitry, dedicated logic, programmable logic, etc.), software (such as instructions run on a processing device), or a combination thereof. In one embodiment, method 420 may be performed by the thread resource management mechanism 110 of FIG. 1.

Method 420 relates to and describes a job scheduler transaction involving job scheduler 218 of FIG. 2. Method 420 begins at block 422 with job scheduler 218 of FIG. 2 receiving a report/list identifying the victim job/message types and the starvation factor. At block 424, a decision is made as to whether there is at least one victim job type in the list. If not, at block 426, no change is made to the existing job type priority. If yes, at block 428, a fair usage intervention decision is triggered. At block 430, the list of job types is reordered to dequeue by decreasing the starvation factor. At block 432, any victims are prioritized by adding work hosts to boost the processing of victim job types.

Figure 4C:
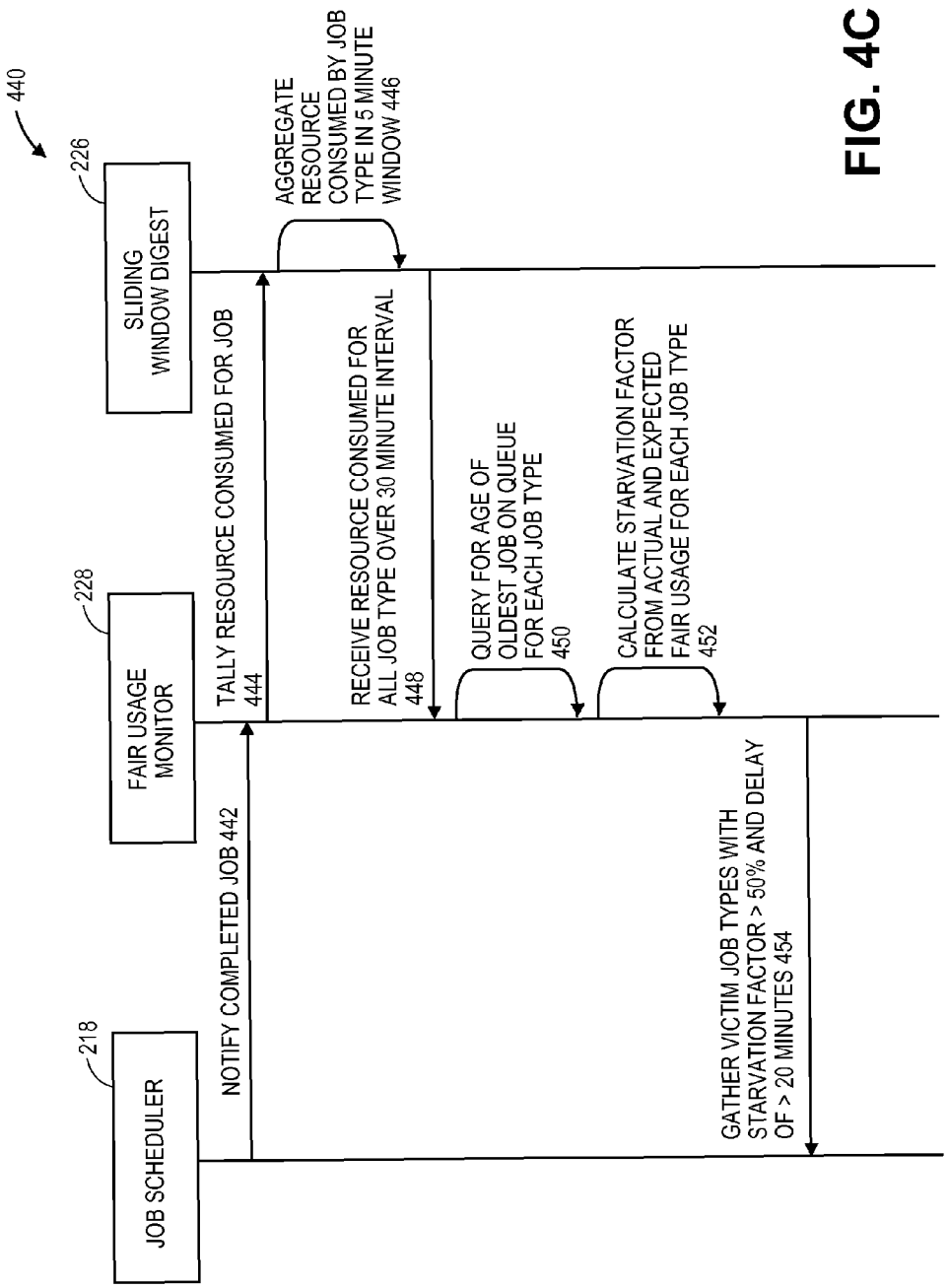
FIGS. 4C-4D illustrates transaction sequences for facilitating a fair allocation and usage of thread resources for user messages according to one embodiment.

FIG. 4C illustrates a transaction sequence 440 for facilitating a fair allocation and usage of thread resources for user messages according to one embodiment. Method 440 may be performed by processing logic that may comprise hardware (e.g., circuitry, dedicated logic, programmable logic, etc.), software (such as instructions run on a processing device), or a combination thereof. In one embodiment, transaction sequence 440 may be performed by the thread resource management mechanism 110 of FIG. 1.

Transaction sequence 440 relates to and describes a resource utilization tracker transaction. In one embodiment, job scheduler 218 communicates notification of a completed job/message of a particular type 442 to fair usage monitor 228 which then tallies the resources consumed for performing or completing the job 444. At sliding window digest 226, the resources consumed by the job type in a defined time period (e.g., 5 minutes) are aggregated 446. The resources consumed from or by all job types over a defined time period interval (e.g., 30-minute interval) are received 448 at fair usage monitor 228 from sliding window digest 226. At fair usage monitor 228, ages of all job types on the queue is determined including the age of the oldest job on the queue for each job type is queried 450. Further, at fair usage monitor 228, calculation for the starvation factor from actual and expected fair usage for each job type is performed 452. The starvation factor greater than 50% with the delay of less than 20 minutes for any of the victim job types is gathered 454 at fair usage monitor 228 and communicated on to job scheduler 218.

Figure 4D:
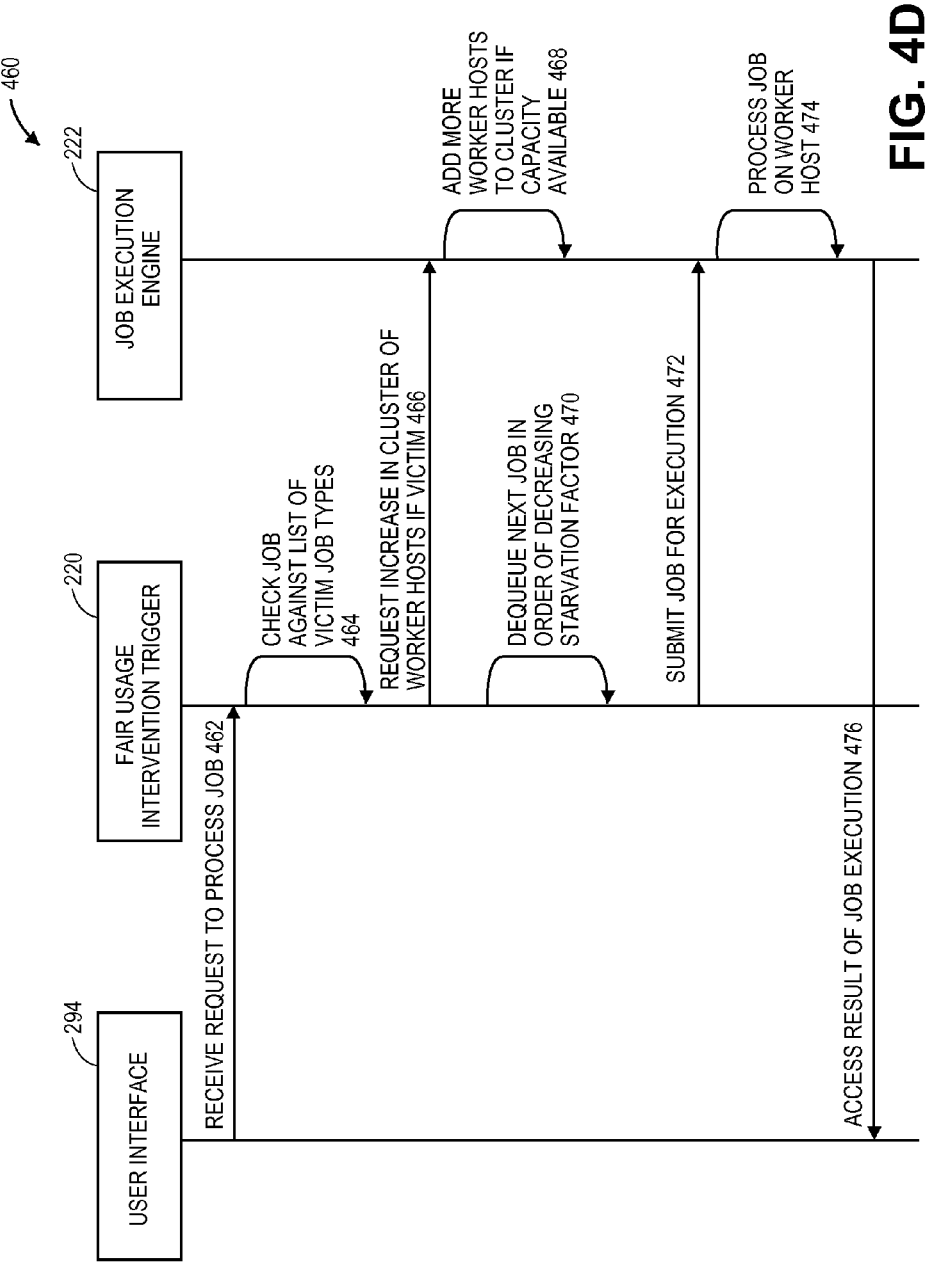

FIG. 4D illustrates a transaction sequence 460 for facilitating a fair allocation and usage of thread resources for user messages according to one embodiment. Method 460 may be performed by processing logic that may comprise hardware (e.g., circuitry, dedicated logic, programmable logic, etc.), software (such as instructions run on a processing device), or a combination thereof. In one embodiment, transaction sequence 460 may be performed by the thread resource management mechanism 110 of FIG. 1.

Transaction sequence 460 relates to and describes a job scheduler transaction. Transaction 460 begins with fair usage intervention trigger 220 receiving a request to process a job 462 from a user via user interface 294 at a client computing device. At fair usage intervention trigger 220, the job is checked against all the victim job types in the victim job types list 464. Then, if the job is regarded as a victim job type (such as matched with a victim job type in the list), an increase in the cluster of worker hosts is requested 466 from job execution engine 222. In response to the request, at job execution engine 222, more worker nodes are added to the cluster if the capacity is available 468. At fair usage intervention trigger 220, the next job is dequeued in the order of decreasing starvation factor 470, while the job is submitted for execution 472 to job execution engine 222. At job execution engine 222, the job is processed on a worker host 474. The user may access the result obtained from the job execution 476 via user interface 294.

Figure 5:
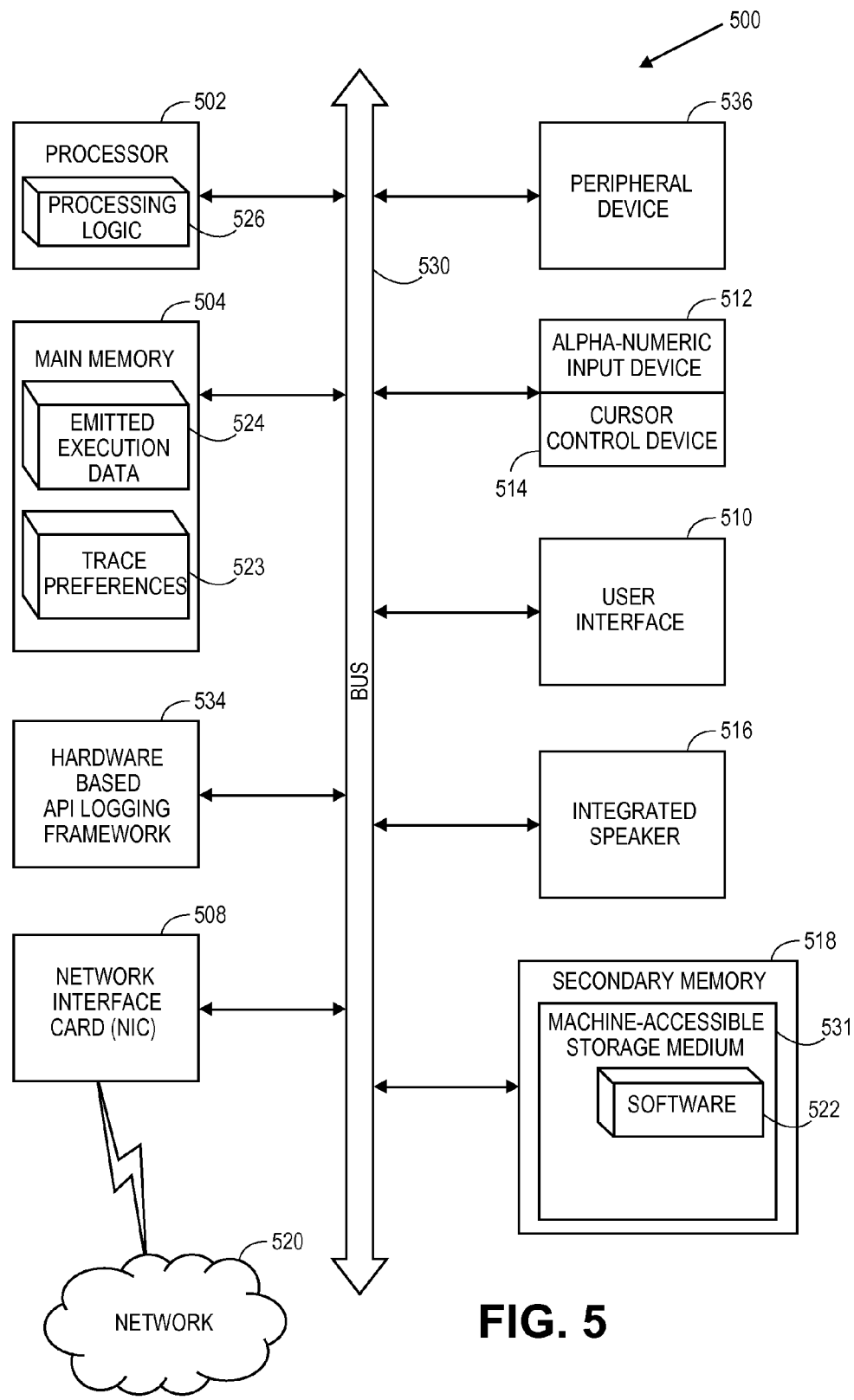
FIG. 5 illustrates a computer system according to one embodiment.

FIG. 5 illustrates a diagrammatic representation of a machine 500 in the exemplary form of a computer system, in accordance with one embodiment, within which a set of instructions, for causing the machine 500 to perform any one or more of the methodologies discussed herein, may be executed. Machine 500 is the same as or similar to computing device 100 and computing device 290 of FIG. 1 and FIG. 2, respectively. In alternative embodiments, the machine may be connected (e.g., networked) to other machines in a network (such as host machine 100 of FIG. 1 connected with client machine 290 over network 285 of FIG. 2), such as a cloud-based network, a Local Area Network (LAN), a Wide Area Network (WAN), a Metropolitan Area Network (MAN), a Personal Area Network (PAN), an intranet, an extranet, or the Internet. The machine may operate in the capacity of a server or a client machine in a client-server network environment, or as a peer machine in a peer-to-peer (or distributed) network environment or as a server or series of servers within an on-demand service environment, including an on-demand environment providing multi-tenant database storage services. Certain embodiments of the machine may be in the form of a personal computer (PC), a tablet PC, a set-top box (STB), a Personal Digital Assistant (PDA), a cellular telephone, a web appliance, a server, a network router, switch or bridge, computing system, or any machine capable of executing a set of instructions (sequential or otherwise) that specify actions to be taken by that machine. Further, while only a single machine is illustrated, the term "machine" shall also be taken to include any collection of machines (e.g., computers) that individually or jointly execute a set (or multiple sets) of instructions to perform any one or more of the methodologies discussed herein.

The exemplary computer system 500 includes a processor 502, a main memory 504 (e.g., read-only memory (ROM), flash memory, dynamic random access memory (DRAM) such as synchronous DRAM (SDRAM) or Rambus DRAM (RDRAM), etc., static memory such as flash memory, static random access memory (SRAM), volatile but high-data rate RAM, etc.), and a secondary memory 518 (e.g., a persistent storage device including hard disk drives and persistent multi-tenant data base implementations), which communicate with each other via a bus 530. Main memory 504 includes emitted execution data 524 (e.g., data emitted by a logging framework) and one or more trace preferences 523 which operate in conjunction with processing logic 526 and processor 502 to perform the methodologies discussed herein.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processor 502 may also be one or more special-purpose processing devices such as an application specific integrated circuit (ASIC), a field programmable gate array (FPGA), a digital signal processor (DSP), network processor, or the like. Processor 502 is configured to execute the processing logic 526 for performing the operations and functionality of thread resource management mechanism 110 as described with reference to FIG. 1 and other figures discussed herein.

The computer system 500 may further include a network interface card 508. The computer system 500 also may include a user interface 510 (such as a video display unit, a liquid crystal display (LCD), or a cathode ray tube (CRT)), an alphanumeric input device 512 (e.g., a keyboard), a cursor control device 514 (e.g., a mouse), and a signal generation device 516 (e.g., an integrated speaker). The computer system 500 may further include peripheral device 536 (e.g., wireless or wired communication devices, memory devices, storage devices, audio processing devices, video processing devices, etc. The computer system 500 may further include a Hardware based API logging framework 534 capable of executing incoming requests for services and emitting execution data responsive to the fulfillment of such incoming requests.

The secondary memory 518 may include a machine-readable storage medium (or more specifically a machine-accessible storage medium) 531 on which is stored one or more sets of instructions (e.g., software 522) embodying any one or more of the methodologies or functions of thread resource management mechanism 110 as described with reference to FIG. 1 and other figures described herein. The software 522 may also reside, completely or at least partially, within the main memory 504 and/or within the processor 502 during execution thereof by the computer system 500, the main memory 504 and the processor 502 also constituting machine-readable storage media. The software 522 may further be transmitted or received over a network 520 via the network interface card 508. The machine-readable storage medium 531 may include transitory or non-transitory machine-readable storage media.

Portions of various embodiments may be provided as a computer program product, which may include a computer-readable medium having stored thereon computer program instructions, which may be used to program a computer (or other electronic devices) to perform a process according to the embodiments. The machine-readable medium may include, but is not limited to, floppy diskettes, optical disks, compact disk read-only memory (CD-ROM), and magneto-optical disks, ROM, RAM, erasable programmable read-only memory (EPROM), electrically EPROM (EEPROM), magnet or optical cards, flash memory, or other type of media/machine-readable medium suitable for storing electronic instructions.

The techniques shown in the figures can be implemented using code and data stored and executed on one or more electronic devices (e.g., an end station, a network element). Such electronic devices store and communicate (internally and/or with other electronic devices over a network) code and data using computer-readable media, such as non-transitory computer-readable storage media (e.g., magnetic disks; optical disks; random access memory; read only memory; flash memory devices; phase-change memory) and transitory computer—readable transmission media (e.g., electrical, optical, acoustical or other form of propagated signals—such as carrier waves, infrared signals, digital signals). In addition, such electronic devices typically include a set of one or more processors coupled to one or more other components, such as one or more storage devices (non-transitory machine-readable storage media), user input/output devices (e.g., a keyboard, a touchscreen, and/or a display), and network connections. The coupling of the set of processors and other components is typically through one or more busses and bridges (also termed as bus controllers). Thus, the storage device of a given electronic device typically stores code and/or data for execution on the set of one or more processors of that electronic device. Of course, one or more parts of an embodiment may be implemented using different combinations of software, firmware, and/or hardware.

Figure 6:
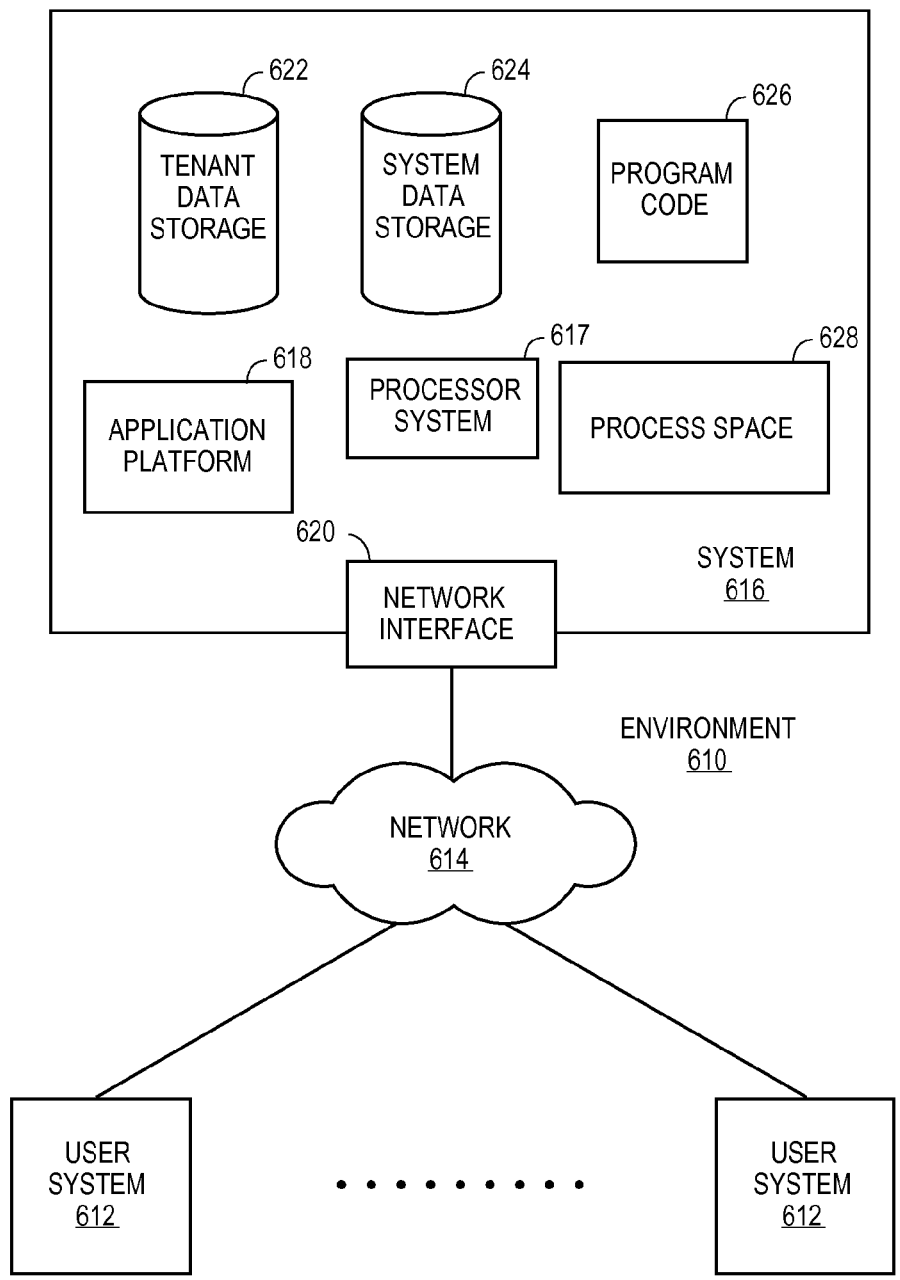
FIG. 6 illustrates an environment wherein an on-demand database service might be used according to one embodiment.

FIG. 6 illustrates a block diagram of an environment 610 wherein an on-demand database service might be used. Environment 610 may include user systems 612, network 614, system 616, processor system 617, application platform 618, network interface 620, tenant data storage 622, system data storage 624, program code 626, and process space 628. In other embodiments, environment 610 may not have all of the components listed and/or may have other elements instead of, or in addition to, those listed above.

Environment 610 is an environment in which an on-demand database service exists. User system 612 may be any machine or system that is used by a user to access a database user system. For example, any of user systems 612 can be a handheld computing device, a mobile phone, a laptop computer, a work station, and/or a network of computing devices. As illustrated in herein FIG. 6 (and in more detail in FIG. 7) user systems 612 might interact via a network 614 with an on-demand database service, which is system 616.

An on-demand database service, such as system 616, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 616" and "system 616" will be used interchangeably herein. A database image may include one or more database objects. A relational database management system (RDMS) or the equivalent may execute storage and retrieval of information against the database object(s). Application platform 618 may be a framework that allows the applications of system 616 to run, such as the hardware and/or software, e.g., the operating system. In an embodiment, on-demand database service 616 may include an application platform 618 that enables creation, managing and executing one or more applications developed by the provider of the on-demand database service, users accessing the on-demand database service via user systems 612, or third party application developers accessing the on-demand database service via user systems 612.

The users of user systems 612 may differ in their respective capacities, and the capacity of a particular user system 612 might be entirely determined by permissions (permission levels) for the current user. For example, where a salesperson is using a particular user system 612 to interact with system 616, that user system has the capacities allotted to that salesperson. However, while an administrator is using that user system to interact with system 616, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 614 is any network or combination of networks of devices that communicate with one another. For example, network 614 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that one or more implementations might use are not so limited, although TCP/IP is a frequently implemented protocol.

User systems 612 might communicate with system 616 using TCP/IP and, at a higher network level, use other common Internet protocols to communicate, such as HTTP, FTP, AFS, WAP, etc. In an example where HTTP is used, user system 612 might include an HTTP client commonly referred to as a "browser" for sending and receiving HTTP messages to and from an HTTP server at system 616. Such an HTTP server might be implemented as the sole network interface between system 616 and network 614, but other techniques might be used as well or instead. In some implementations, the interface between system 616 and network 614 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 616, shown in FIG. 6, implements a web-based customer relationship management (CRM) system. For example, in one embodiment, system 616 includes application servers configured to implement and execute CRM software applications as well as provide related data, code, forms, webpages and other information to and from user systems 612 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 616 implements applications other than, or in addition to, a CRM application. For example, system 616 may provide tenant access to multiple hosted (standard and custom) applications, including a CRM application. User (or third party developer) applications, which may or may not include CRM, may be supported by the application platform 618, which manages creation, storage of the applications into one or more database objects and executing of the applications in a virtual machine in the process space of the system 616.

One arrangement for elements of system 616 is shown in FIG. 6, including a network interface 620, application platform 618, tenant data storage 622 for tenant data 623, system data storage 624 for system data 625 accessible to system 616 and possibly multiple tenants, program code 626 for implementing various functions of system 616, and a process space 628 for executing MTS system processes and tenant-specific processes, such as running applications as part of an application hosting service. Additional processes that may execute on system 616 include database indexing processes.

Several elements in the system shown in FIG. 6 include conventional, well-known elements that are explained only briefly here. For example, each user system 612 could include a desktop personal computer, workstation, laptop, PDA, cell phone, or any other wireless access protocol (WAP) enabled device or any other computing device capable of interfacing directly or indirectly to the Internet or other network connection. User system 612 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g., subscriber of the multi-tenant database system) of user system 612 to access, process and view information, pages and applications available to it from system 616 over network 614. User system 612 further includes Mobile OS (e.g., iOS® by Apple®, Android, WebOS® by Palm®, etc.). Each user system 612 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 616 or other systems or servers. For example, the user interface device can be used to access data and applications hosted by system 616, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 612 and all of its components are operator configurable using applications, such as a browser, including computer code run using a central processing unit such as an Intel Core® processors or the like. Similarly, system 616 (and additional instances of an MTS, where more than one is present) and all of their components might be operator configurable using application(s) including computer code to run using a central processing unit such as processor system 617, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 616 to intercommunicate and to process webpages, applications and other data and media content as described herein are preferably downloaded and stored on a hard disk, but the entire program code, or portions thereof, may also be stored in any other volatile or non-volatile memory medium or device as is well known, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing embodiments can be implemented in any programming language that can be executed on a client system and/or server or server system such as, for example, C, C++, HTML, any other markup language, Java™ JavaScript, ActiveX, any other scripting language, such as VBScript, and many other programming languages as are well known may be used. (Java™ is a trademark of Sun Microsystems, Inc.).

According to one embodiment, each system 616 is configured to provide webpages, forms, applications, data and media content to user (client) systems 612 to support the access by user systems 612 as tenants of system 616. As such, system 616 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

Figure 7:
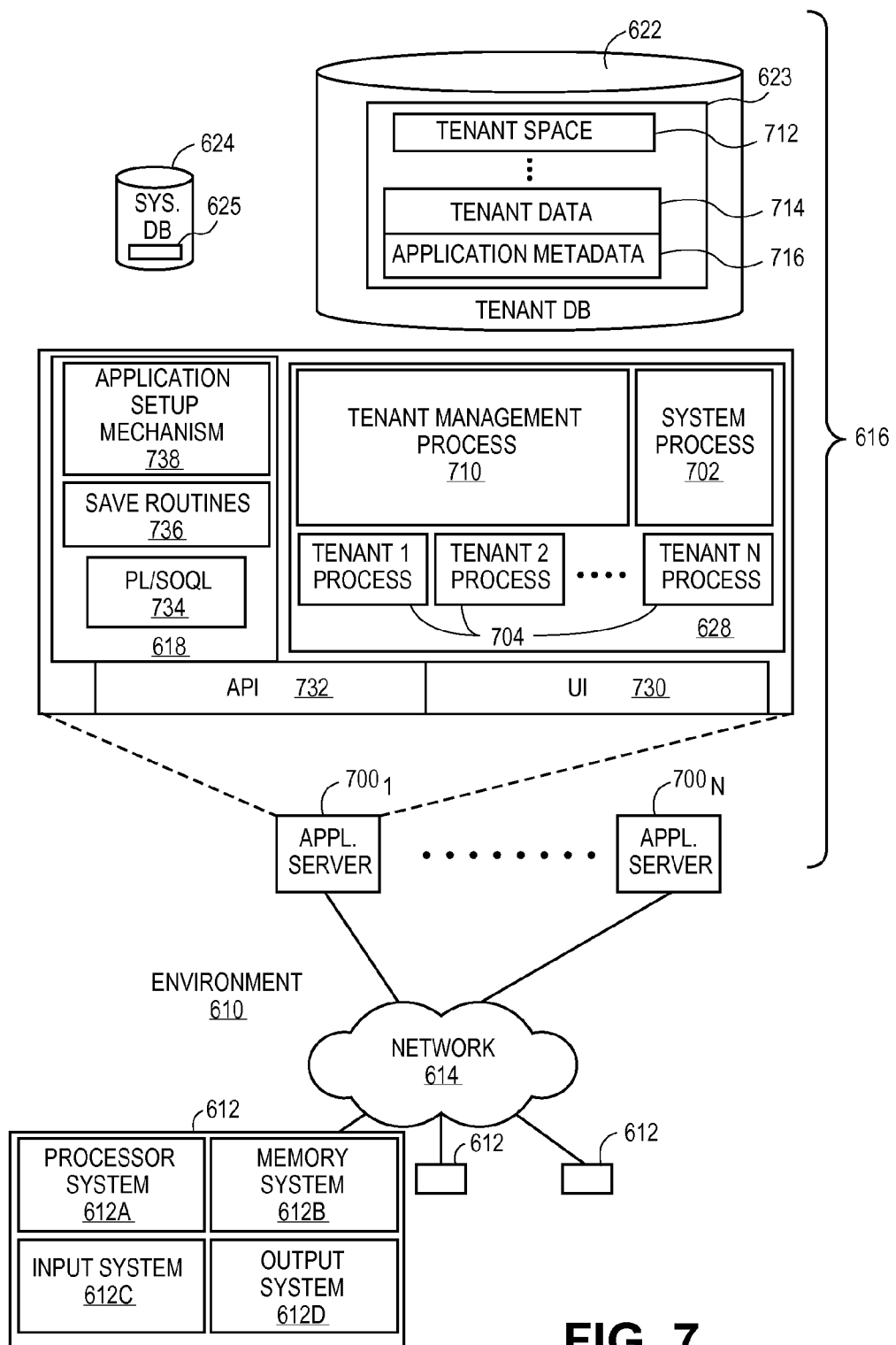
FIG. 7 illustrates elements of environment of FIG. 6 and various possible interconnections between these elements according to one embodiment.

FIG. 7 also illustrates environment 610. However, in FIG. 7 elements of system 616 and various interconnections in an embodiment are further illustrated. FIG. 7 shows that user system 612 may include processor system 612A, memory system 612B, input system 612C, and output system 612D. FIG. 7 shows network 614 and system 616. FIG. 7 also shows that system 616 may include tenant data storage 622, tenant data 623, system data storage 624, system data 625, User Interface (UI) 730, Application Program Interface (API) 732, PL/SOQL 734, save routines 736, application setup mechanism 738, applications servers 700$_1$-700$_N$, system process space 702, tenant process spaces 704, tenant management process space 710, tenant storage area 712, user storage 714, and application metadata 716. In other embodiments, environment 610 may not have the same elements as those listed above and/or may have other elements instead of, or in addition to, those listed above.

User system 612, network 614, system 616, tenant data storage 622, and system data storage 624 were discussed above in FIG. 6. Regarding user system 612, processor system 612A may be any combination of one or more processors. Memory system 612B may be any combination of one or more memory devices, short term, and/or long term memory. Input system 612C may be any combination of input devices, such as one or more keyboards, mice, trackballs, scanners, cameras, and/or interfaces to networks. Output system 612D may be any combination of output devices, such as one or more monitors, printers, and/or interfaces to networks. As shown by FIG. 7, system 616 may include a network interface 620 (of FIG. 6) implemented as a set of HTTP application servers 700, an application platform 618, tenant data storage 622, and system data storage 624. Also shown is system process space 702, including individual tenant process spaces 704 and a tenant management process space 710. Each application server 700 may be configured to tenant data storage 622 and the tenant data 623 therein, and system data storage 624 and the system data 625 therein to serve requests of user systems 612. The tenant data 623 might be divided into individual tenant storage areas 712, which can be either a physical arrangement and/or a logical arrangement of data. Within each tenant storage area 712, user storage 714 and application metadata 716 might be similarly allocated for each user. For example, a copy of a user's most recently used (MRU) items might be stored to user storage 714. Similarly, a copy of MRU items for an entire organization that is a tenant might be stored to tenant storage area 712. A UI 730 provides a user interface and an API 732 provides an application programmer interface to system 616 resident processes to users and/or developers at user systems 612. The tenant data and the system data may be stored in various databases, such as one or more Oracle™ databases.

Application platform 618 includes an application setup mechanism 738 that supports application developers' creation and management of applications, which may be saved as metadata into tenant data storage 622 by save routines 736 for execution by subscribers as one or more tenant process spaces 704 managed by tenant management process 710 for example. Invocations to such applications may be coded using PL/SOQL 734 that provides a programming language style interface extension to API 732. A detailed description of some PL/SOQL language embodiments is discussed in commonly owned U.S. Pat. No. 7,730,478 entitled, "Method and System for Allowing Access to Developed Applicants via a Multi-Tenant Database On-Demand Database Service", issued Jun. 1, 2010 to Craig Weissman, which is incorporated in its entirety herein for all purposes. Invocations to applications may be detected by one or more system processes, which manage retrieving application metadata 716 for the subscriber making the invocation and executing the metadata as an application in a virtual machine.

Each application server 700 may be communicably coupled to database systems, e.g., having access to system data 625 and tenant data 623, via a different network connection. For example, one application server $700_1$ might be coupled via the network 614 (e.g., the Internet), another application server $700_{N-1}$ might be coupled via a direct network link, and another application server $700_N$ might be coupled by yet a different network connection. Transfer Control Protocol and Internet Protocol (TCP/IP) are typical protocols for communicating between application servers 700 and the database system. However, it will be apparent to one skilled in the art that other transport protocols may be used to optimize the system depending on the network interconnect used.

In certain embodiments, each application server 700 is configured to handle requests for any user associated with any organization that is a tenant. Because it is desirable to be able to add and remove application servers from the server pool at any time for any reason, there is preferably no server affinity for a user and/or organization to a specific application server 700. In one embodiment, therefore, an interface system implementing a load balancing function (e.g., an F5 Big-IP load balancer) is communicably coupled between the application servers 700 and the user systems 612 to distribute requests to the application servers 700. In one embodiment, the load balancer uses a least connections algorithm to route user requests to the application servers 700. Other examples of load balancing algorithms, such as round robin and observed response time, also can be used. For example, in certain embodiments, three consecutive requests from the same user could hit three different application servers 700, and three requests from different users could hit the same application server 700. In this manner, system 616 is multi-tenant, wherein system 616 handles storage of, and access to, different objects, data and applications across disparate users and organizations.

As an example of storage, one tenant might be a company that employs a sales force where each salesperson uses system 616 to manage their sales process. Thus, a user might maintain contact data, leads data, customer follow-up data, performance data, goals and progress data, etc., all applicable to that user's personal sales process (e.g., in tenant data storage 622). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 616 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 616 might also maintain system level data usable by multiple tenants or other data. Such system level data might include industry reports, news, postings, and the like that are sharable among tenants.

In certain embodiments, user systems 612 (which may be client systems) communicate with application servers 700 to request and update system-level and tenant-level data from system 616 that may require sending one or more queries to tenant data storage 622 and/or system data storage 624. System 616 (e.g., an application server 700 in system 616) automatically generates one or more SQL statements (e.g., one or more SQL queries) that are designed to access the desired information. System data storage 624 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "Custom Entities and Fields in a Multi-Tenant Database System", and which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

Any of the above embodiments may be used alone or together with one another in any combination. Embodiments encompassed within this specification may also include embodiments that are only partially mentioned or alluded to or are not mentioned or alluded to at all in this brief summary or in the abstract. Although various embodiments may have been motivated by various deficiencies with the prior art, which may be discussed or alluded to in one or more places in the specification, the embodiments do not necessarily address any of these deficiencies. In other words, different embodiments may address different deficiencies that may be discussed in the specification. Some embodiments may only partially address some deficiencies or just one deficiency that may be discussed in the specification, and some embodiments may not address any of these deficiencies.

While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements. It is to be understood that the above description is intended to be illustrative, and not restrictive.

What is claimed is:

1. A database system-implemented method, comprising:
tracking, by the database system, resource usage associated with a plurality of job types requested by one or more tenants in a multi-tenant environment;
calculating, by the database system, a deficiency factor suffered by a job type associated with a tenant, wherein the deficiency factor is based on an actual usage and an expected usage of resources by the job type, wherein the deficiency factor indicates deficiency in usage of the resources by the job type such that the deficiency corresponds to the actual usage of the resources by the job type being lower than the expected usage assigned to the job type by measuring the usage over multiple predetermined segments of time, wherein the deficiency being temporary deficiency or chronic deficiency based on high latency in queuing time or high usage of the resources by one or more of the plurality of job types; and
enforcing, by the database system, an equitable distribution of the resources for the plurality of job types by adjusting a current distribution representing an inequitable distribution, wherein adjusting includes selectively lowering the high usage of the resources by the one or more job types until the deficiency factor is inconsequential such that the actual usage by the job type has increased to match the expected usage.

2. The method of claim 1, wherein calculating further comprises:
computing the actual usage by the job type and one or more actual usages representing the high usage by the one or more job types; and
computing the expected usage associated with the job type and one or more expected usages associated with the one or more job types.

3. The method of claim 1, wherein enforcing comprises triggering fair usage to ensure the equitable distribution of the resources for the plurality of job types.

4. The method of claim 3, wherein triggering comprises prioritizing one or more work hosts associated with the job type to boost processing of tasks associated with the job type, wherein prioritizing is performed over the multiple predetermined segments of time.

5. The method of claim 1, further comprising receiving a job request to perform the job type, wherein the job request is placed at a computing device associated with the tenant in the multi-tenant environment, wherein the job request is placed by a user having access to the computing device.

6. The method of claim 1, wherein the resource usage comprises usage of thread resources, wherein the thread resources are accessed via a plurality of message queues.

7. The method of claim 1, wherein selectively lowering the high usage comprises: minimizing the deficiency factor by automatically adapting a selection process for selection of the plurality of job types; and real-time tracking of the resource usage based on at least one of a sliding window scale, fairness usage, queuing time, and adaptive intervention via configurable threshold, wherein the sliding window scale to facilitate the multiple predetermined segments of time.

8. A system comprising a computing device having a memory device to store instructions, and a processing device to execute the instructions to facilitate a mechanism to perform operations comprising:
tracking, resource usage associated with a plurality of job types requested by one or more tenants in a multi-tenant environment;
calculating, a deficiency factor suffered by a job type associated with a tenant, wherein the deficiency factor is based on an actual usage and an expected usage of resources by the job type, wherein the deficiency factor indicates deficiency in usage of the resources by the job type such that the deficiency corresponds to the actual usage of the resources by the job type being lower than the expected usage assigned to the job type by measuring the usage over multiple predetermined segments of time, wherein the deficiency being temporary deficiency or chronic deficiency based on high latency in queuing time or high usage of the resources by one or more of the plurality of job types; and
enforcing an equitable distribution of the resources for the plurality of job types by adjusting a current distribution representing an inequitable distribution, wherein adjusting includes selectively lowering the high usage of the resources by the one or more job types until the deficiency factor is inconsequential such that the actual usage by the job type has increased to match the expected usage.

9. The system of claim 8, wherein the calculating comprises:
computing the actual usage by the job type and one or more actual usages representing the high usage by the one or more job types; and
computing the expected usage associated with the job type and one or more expected usages associated with the one or more job types.

10. The system of claim 8, wherein enforcing comprise triggering fair usage to ensure the equitable distribution of the resources for the plurality of job types.

11. The system of claim 10, wherein triggering comprises prioritizing one or more work hosts associated with the job type to boost processing of tasks associated with the job type, wherein prioritizing is performed over the multiple predetermined segments of time.

12. The system of claim 8, wherein the operations further comprise receiving a job request to perform the job type, wherein the job request is placed at a computing device associated with the tenant in the multi-tenant environment, wherein the job request is placed by a user having access to the computing device.

13. The system of claim 8, wherein the resource usage comprises usage of thread resources, wherein the thread resources are accessed via a plurality of message queues.

14. The system of claim 8, wherein selectively lowering the high usage comprises:
minimizing the deficiency factor by automatically adapting a selection process for selection of the plurality of job types; and
real-time tracking of the resource usage based on at least one of a sliding window scale, fairness usage, queuing time, and adaptive intervention via configurable threshold, wherein the sliding window scale to facilitate the multiple predetermined segments of time.

15. A non-transitory machine-readable medium having stored thereon instructions which, when executed by a machine, cause the machine to perform operations comprising:
tracking resource usage associated with a plurality of job types requested by one or more tenants in a multi-tenant environment;
calculating a deficiency factor suffered by a job type associated with a tenant, wherein the deficiency factor is based on an actual usage and an expected usage of resources by the job type, wherein the deficiency factor indicates deficiency in usage of the resources by the job type such that the deficiency corresponds to the actual usage of the resources by the job type being lower than the expected usage assigned to the job type by measuring the usage over multiple predetermined segments of time, wherein the deficiency being temporary deficiency or chronic deficiency based on high latency in queuing time or high usage of the resources by one or more of the plurality of job types; and
enforcing an equitable distribution of the resources for the plurality of job types by adjusting a current distribution representing an inequitable distribution, wherein adjusting includes selectively lowering the high usage of the resources by the one or more job types until the deficiency factor is inconsequential such that the actual usage by the job type has increased to match the expected usage.

16. The non-transitory machine-readable medium of claim 15, wherein the calculating comprises:
computing the actual usage by the job type and one or more actual usages representing the high usage by the one or more job types; and
computing the expected usage associated with the job type and one or more expected usages associated with the one or more job types.

17. The non-transitory machine-readable medium of claim 15, wherein enforcing comprise triggering fair usage to ensure the equitable distribution of the resources for the plurality of job types.

18. The non-transitory machine-readable medium of claim 17, wherein triggering comprises prioritizing one or more work hosts associated with the job type to boost processing of tasks associated with the job type, wherein prioritizing is performed over the multiple predetermined segments of time.

19. The non-transitory machine-readable medium of claim 15, wherein the operations further comprise receiving a job request to perform the job type, wherein the job request is placed at a computing device associated with the tenant in the multi-tenant environment, wherein the job request is placed by a user having access to the computing device.

20. The non-transitory machine-readable medium of claim 15, wherein the resource usage comprises usage of thread resources, wherein the thread resources are accessed via a plurality of message queues.

21. The non-transitory machine-readable medium of claim 15, wherein selectively lowering the high usage comprises:
minimizing the deficiency factor by automatically adapting a selection process for selection of the plurality of job types; and
real-time tracking of the resource usage based on at least one of a sliding window scale, fairness usage, queuing time, and adaptive intervention via configurable threshold, wherein the sliding window scale to facilitate the multiple predetermined segments of time.

\* \* \* \* \*